United States Patent
Okada

(10) Patent No.: US 11,024,033 B2
(45) Date of Patent: Jun. 1, 2021

(54) METHOD AND APPARATUS FOR PROCESSING IMAGE AND COMPUTER PROGRAM PRODUCT THEREOF

(71) Applicant: SAMSUNG ELECTRONICS CO., LTD., Suwon-si (KR)

(72) Inventor: Shintaro Okada, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 16/235,701

(22) Filed: Dec. 28, 2018

(65) Prior Publication Data

US 2019/0206058 A1    Jul. 4, 2019

(30) Foreign Application Priority Data

Dec. 28, 2017 (JP) .............................. JP2017-254144
Nov. 30, 2018 (KR) ........................ 10-2018-0153009

(51) Int. Cl.
*G06T 7/12* (2017.01)
*G06T 5/00* (2006.01)
*G06T 5/50* (2006.01)

(52) U.S. Cl.
CPC .............. *G06T 7/12* (2017.01); *G06T 5/002* (2013.01); *G06T 5/008* (2013.01); *G06T 5/50* (2013.01); *G06T 2207/20192* (2013.01); *G06T 2207/20221* (2013.01)

(58) Field of Classification Search
CPC .. G06T 7/12; G06T 5/008; G06T 5/50; G06T 5/002; G06T 2207/20192; G06T 2207/20221
USPC ......................................................... 382/254
See application file for complete search history.

(56) References Cited

U.S. PATENT DOCUMENTS

| | | | |
|---|---|---|---|
| 6,075,902 A | 6/2000 | Kojima | |
| 7,792,384 B2 | 9/2010 | Gomi et al. | |
| 8,164,594 B2 | 4/2012 | Watanabe et al. | |
| 8,363,971 B2* | 1/2013 | Sato | H04N 7/0132 382/254 |
| 2017/0109891 A1* | 4/2017 | Mosher | G06T 5/002 |

FOREIGN PATENT DOCUMENTS

| | | |
|---|---|---|
| CN | 105488793 B | 1/2019 |
| JP | 4-51378 A | 2/1992 |
| JP | 7-170395 A | 7/1995 |

(Continued)

OTHER PUBLICATIONS

International Search Report and Written Opinion dated Apr. 1, 2019, issued by the International Searching Authority in International Application No. PCT/KR2018/016778 (PCT/ISA/210 and PCT/ISA/237).

(Continued)

*Primary Examiner* — Amandeep Saini
(74) *Attorney, Agent, or Firm* — Sughrue Mion, PLLC

(57) ABSTRACT

Provided is an image processing method including determining an edge region based on contrast of values of pixels included in an image; identifying an outline region in the edge region according to distribution characteristics of values of pixels included in the edge region; and, as the outline region is identified, performing blurring processing for reducing contrast of values of pixels included in at least a portion of the outline region.

16 Claims, 21 Drawing Sheets

(56) References Cited

FOREIGN PATENT DOCUMENTS

| JP | 2000-134471 | A |   | 5/2000 |
|----|-------------|---|---|--------|
| JP | 2001-157060 | A |   | 6/2001 |
| JP | 2004-282593 | A |   | 10/2004 |
| JP | 3650766 | B2 |   | 5/2005 |
| JP | 2006-221403 | A |   | 8/2006 |
| JP | 2007-295321 | A |   | 11/2007 |
| JP | 2007295321 | A | * | 11/2007 |
| JP | 2008-4085 | A |   | 1/2008 |
| JP | 2009-251839 | A |   | 10/2009 |
| JP | 2009251839 | A | * | 10/2009 |
| JP | 5243833 | B2 |   | 7/2013 |
| KR | 10-2016-0069804 | A |   | 6/2016 |
| KR | 20160069804 | A | * | 6/2016 |
| WO | 2015/033695 | A1 |   | 3/2015 |

OTHER PUBLICATIONS

Communication dated Sep. 21, 2020 issued by the European Patent Office in European Application No. 18895085.1.
Hel-Or, H., et al., "Depth-Stretch: Enhancing Depth Perception Without Depth", 2017 IEEE Conference on Computer Vision and Pattern Recognition Workshops, Jul. 21, 2017, XP033145879, pp. 1006-1014.
Rajae-Joordens, R., et al., "49.4: Effect of Resolution, Sharpness, Contrast and Luminance on Depth Impression and Overall Image Quality for a 2D TV", 2004 SID International Symposium, May 25-27, 2004, vol. 35, XP007011974, pp. 1370-1373.

* cited by examiner

FIG. 7
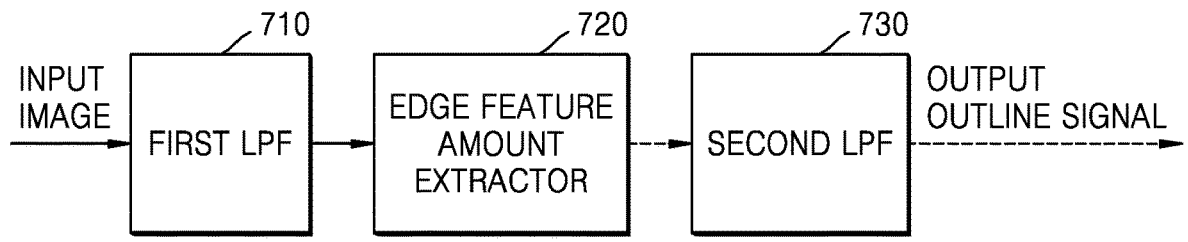
FIG. 8
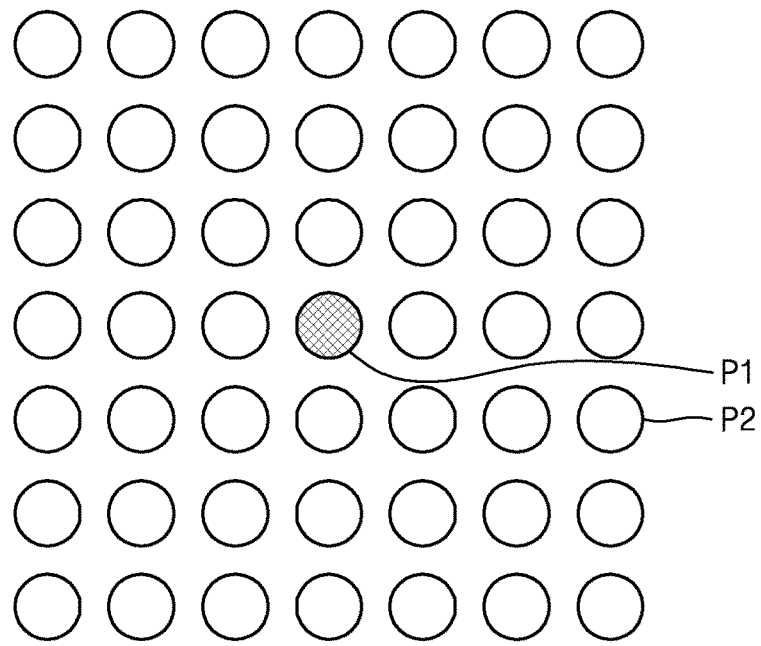
FIG. 9

METHOD AND APPARATUS FOR PROCESSING IMAGE AND COMPUTER PROGRAM PRODUCT THEREOF

CROSS-REFERENCE TO RELATED APPLICATION(S)

This application claims priority from Japanese Patent Application No. 2017-254144, filed on Dec. 28, 2017, in the Japanese Patent Office and Korean Patent Application No. 10-2018-0153009, filed on Nov. 30, 2018, in the Korean Intellectual Property Office, the disclosures of which are herein incorporated by reference in their entireties.

BACKGROUND

1. Field

The disclosure relates to a method of processing an image, an apparatus for processing an image, and a computer program product including a computer-readable recording medium having recorded thereon a computer program which performs the method of processing an image.

2. Description of Related Art

In recent years, image media having various functions and high image quality have been rapidly developed. As consumer demand to view such image media increases, so too does the need for ultra-high image quality. In these circumstances, technological development of ultra-high resolution TVs and the like beyond 2K broadcasting is actively being performed.

Generally, an image display device for displaying an ultra-high resolution image displays an image by performing enhancement processing or the like on input image data. When enhancement processing is performed by an image display device, the same enhancement processing is performed on an entire region at once without consideration of the characteristics of an image, and thus the three-dimensional impression of the image may be deteriorated. Accordingly, a technique for processing an image without deteriorating the three-dimensional impression of an image is desirable.

SUMMARY

Provided are methods and apparatuses for processing an image capable of improving quality without deteriorating the stereoscopic impression or distance impression of the image by performing blurring processing and enhancement processing according to characteristics of regions in the image.

Additional aspects will be set forth in part in the description which follows and, in part, will be apparent from the description, or may be learned by practice of the presented embodiments.

In accordance with an aspect of the disclosure, there is provided an image processing method including determining an edge region in an image based on contrast of values of pixels included in the image; identifying an outline region in the edge region according to a distribution of characteristics of values of the pixels included in the edge region; and, performing blurring processing for reducing contrast of values of pixels included in the outline region.

In accordance with an aspect of the disclosure, there is provided an image processing apparatus including a memory configured to store computer-readable instructions; a display; and a processor configured to execute the computer-readable instructions stored in the memory, which when executed the processor is configured to control the image processing apparatus to perform an image processing method, the image processing method comprising determining an edge region in an image based on contrast of values of pixels included in the image, identifying an outline region in the edge region according to a distribution of characteristics of values of the pixels included in the edge region, and, performing blurring processing for reducing contrast of values of pixels included in the outline region.

In accordance with an aspect of the disclosure, there is provided a computer program product including a computer-readable recording medium having recorded thereon a computer program configured to perform determining an edge region in an image based on contrast of values of pixels included in the image; identifying an outline region in the edge region according to a distribution of characteristics of values of the pixels included in the edge region; and, performing blurring processing for reducing contrast of values of pixels included in the outline region.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a block diagram showing an outline extractor according to an embodiment;

FIG. 8 is a diagram showing an FIR filter used for blurring, according to an embodiment;

FIG. 9 is a diagram showing a Sobel filter used for edge feature amount extraction, according to an embodiment;

DETAILED DESCRIPTION

Figure 1:
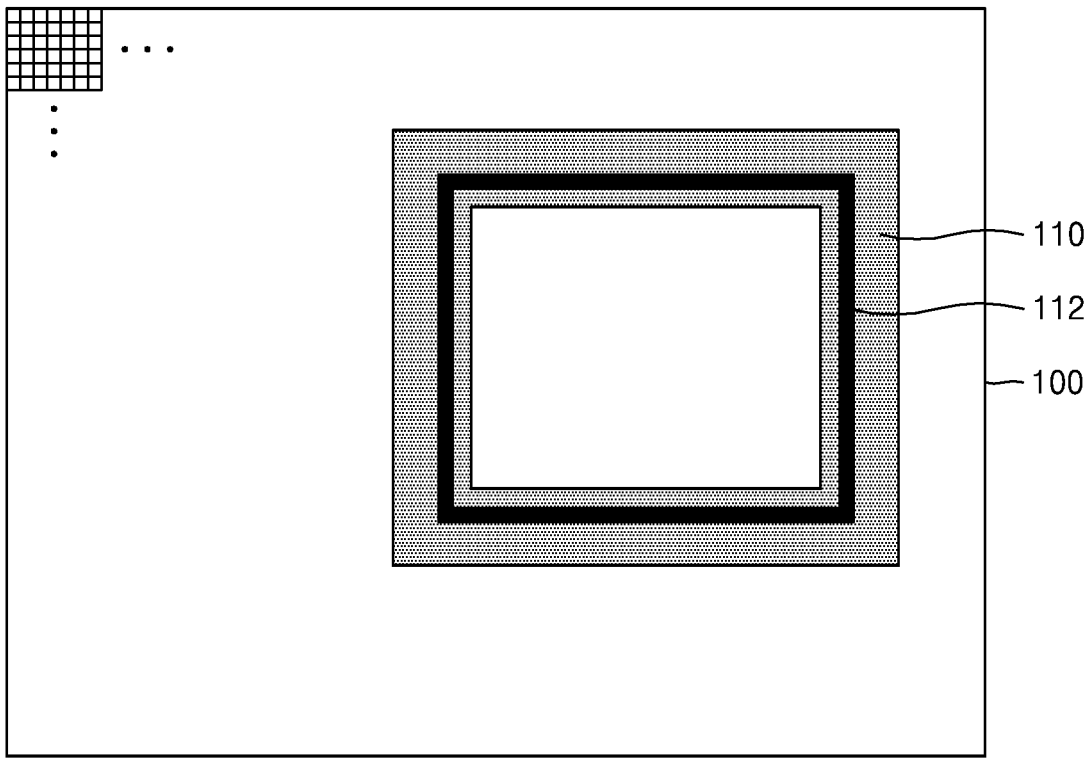
FIG. 1 is a conceptual diagram for describing an image processing method according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list, such that expressions of or similar to "at least one of a, b, and c" include a only, b only, c only, a and b only, a and c only, b and c only, and all of a, b, and c.

The terms used in this specification will be briefly described, and the disclosure will be described in detail.

With respect to the terms in the various embodiments of the disclosure, the general terms which are currently and widely used are selected in consideration of functions of structural elements in the various embodiments of the disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the disclosure. Therefore, the terms used in the various embodiments of the disclosure should be defined based on the meanings of the terms and the descriptions provided herein.

Terms including ordinals such as first, second, etc. may be used to describe various elements, but the elements are not limited by terms. The above terms may be used only to distinguish one element from another. For example, without departing from the scope of the disclosure, a first element may be referred to as a second element, and similarly, a second element may also be referred to as a first element. The term "and/or" includes any combination of a plurality of related items or any of a plurality of related items.

In addition, unless explicitly described to the contrary, the word "comprise" and variations such as "comprises" or "comprising" will be understood to convey the inclusion of stated elements but not the exclusion of any other elements. Furthermore, the term "unit" or "module" used in the specification means a software component or a hardware component like FPGA or ASIC, and "unit" performed a certain role. However, the term "unit" or "module" is not meant to be limited to software or hardware. A "unit" or "module" may be configured to be on an addressable storage medium and may be configured to play back one or more processors. Therefore, for example, the "units" and "modules" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" or "modules" may be combined to smaller numbers of components and "units" or "modules" or may be further divided into larger numbers of components and "units" or "modules."

Hereinafter, embodiments of the disclosure will be described in detail with reference to the accompanying drawings. Operations in the disclosure may, however, be embodied in many different forms and should not be construed as limited to the embodiments set forth herein. In order to clearly illustrate the disclosure, parts not related to the description are omitted, and like parts are denoted by like reference numerals throughout the specification.

FIG. 1 is a conceptual diagram for describing an image processing method according to an embodiment.

Referring to FIG. 1, an image processing apparatus according to an embodiment may determine an edge region 110 in an image 100 including a plurality of pixels. An edge region refers to a region having a large contrast of values (e.g., luminance) of pixels therein. In other words, a region where values of a plurality of pixels are abruptly changed may be defined as an edge region. For example, the image processing apparatus may compare the values of a plurality of pixels to identify a region corresponding to a difference of values equal to or greater than a pre-set value and determine the identified region as an edge region.

Also, the image processing apparatus according to an embodiment may identify an outline region 112 within the edge region 110. The features of the outline region 112 in the disclosure are as follows.

Feature 1: The contrast of pixels included in the outline region is large.

Feature 2: The variance of edge feature amounts in the outline region is low.

In the above-stated feature 2, the edge feature amount may be determined by using one or a combination of two or more of a Harr-like feature amount, a pixel difference feature amount, a histograms of oriented gradients (HOG) feature amount, an edge of orientation histogram (EOH) feature amount, and an Edglete feature amount.

The image processing apparatus may perform blurring processing on at least some of the pixels included in the outline region 112. For example, the image processing apparatus may perform blurring processing on all of the pixels included in the outline region 112. In another example, the image processing apparatus may perform blurring processing on pixels whose contrast exceeds a critical value from among the pixels included in the outline region 112. The image processing apparatus may perform blurring processing on at least some the pixels included in the outline region 112, thereby providing the image 100 with a three-dimensional impression or a sense of depth.

As the outline region 112 is identified, an image processing apparatus according to another embodiment may perform enhancement processing on at least some of regions of the image 100 excluding the outline region 112. For example, the image processing apparatus may perform enhancement processing on pixels included in the regions of the image 100 excluding the outline region 112 or on pixels included in the regions of the image 100 excluding the edge region 110. The image processing apparatus may perform enhancement processing on at least some of the regions of the image 100 excluding the outline region 112, thereby preventing an image from being displayed as an unnatural image due to loss of the stereoscopic impression or the distance impression of the image 100.

As the outline region 112 is identified, an image processing apparatus according to another embodiment may perform blurring processing on at least a portion of the outline region 112 and perform blurring processing on at least some of regions excluding the outline region 112.

Hereinafter, a method by which an image processing apparatus identifies regions in an image according to characteristics of pixels included in the image and performs blurring or enhancement processing on the identified regions will be described in more detail.

Figure 2:
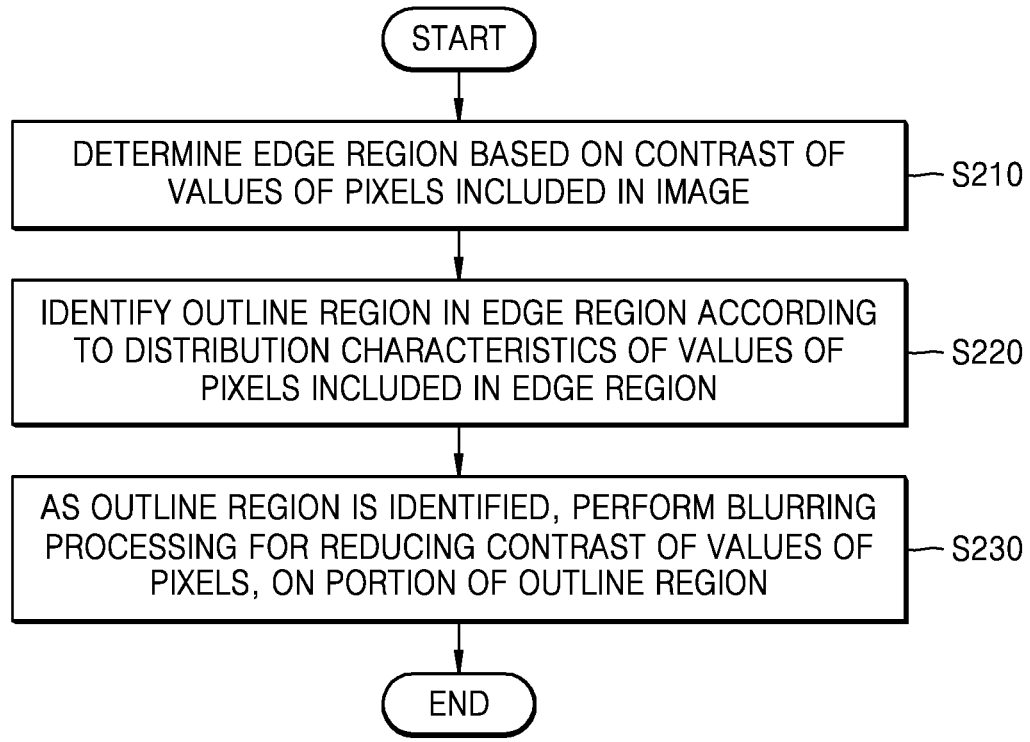
FIG. 2 is a flowchart of a method of performing blurring processing, according to an embodiment.

FIG. 2 is a flowchart of a method of performing a blurring processing according to an embodiment.

In operation S210, an image processing apparatus may determine an edge region whose contrast of values of pixels included therein is equal to or greater than a pre-set value in an image. Here, the value of the pixels may be, for example, the luminance value. However, the luminance value is merely an example, and the values of the pixels are not limited to the above-described example.

In operation S220, the image processing apparatus may identify an outline region within the edge region according to the distribution characteristics of the values of the pixels included in the edge region. The image processing apparatus according to an embodiment may identify a region having a large contrast between the values of pixels and a low variance of the edge feature amount in the edge region as the outline region. On the other hand, according to an embodiment, the image processing apparatus may obtain information about an outline region in the image. The information about the outline region is information about pixels included in the outline region from among the pixels included in the image and may include the coordinates and the pixel values of the corresponding pixels.

In operation S230, as the outline region is identified, the image processing apparatus may perform a blurring processing that reduces the contrast of the values of pixels to at least a portion of the outline region. The image processing apparatus may output an image in which at least a portion of the outline region is blurred.

On the other hand, according to another embodiment, the image processing apparatus may additionally perform enhancement processing on at least some of regions other than the outline region after performing the blurring processing.

Figure 3:
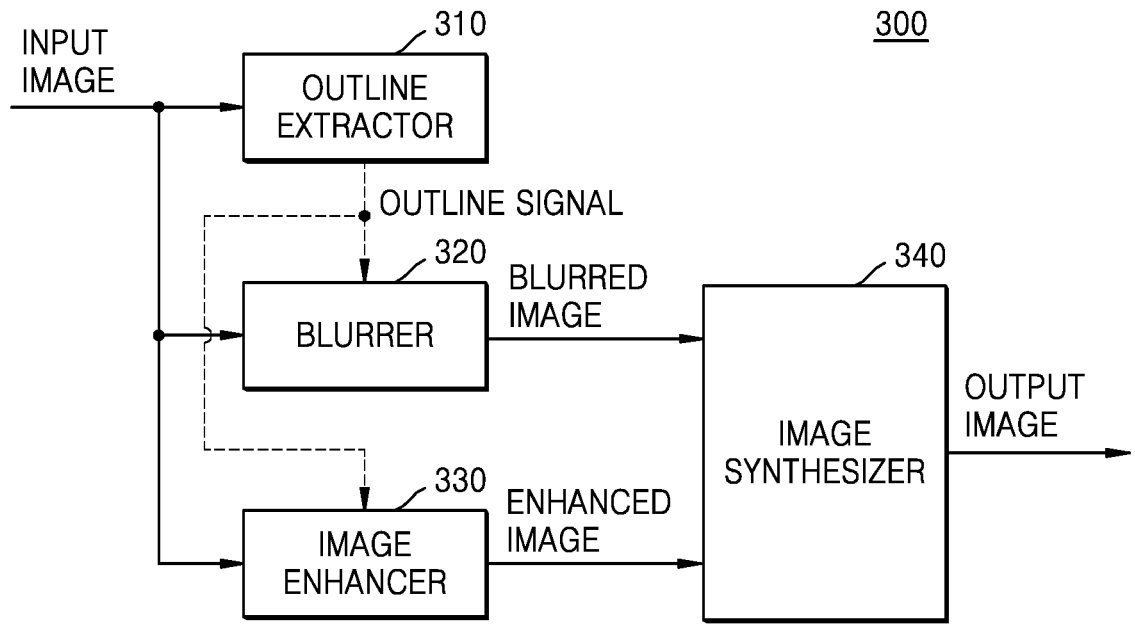
FIG. 3 is a block diagram showing an image processing apparatus according to an embodiment.

FIG. 3 is a block diagram showing an image processing apparatus 300 according to a first embodiment.

As shown in FIG. 3, the image processing apparatus 300 according to the first embodiment may include an outline extractor 310, a blurrer 320, an image enhancer 330, and an image synthesizer 340.

The outline extractor 310, the blurrer 320, the image enhancer 330, and the image synthesizer 340 according to an embodiment may perform processing for each frame of an image or each region including x vertical pixels and x horizontal pixels (x is a positive integer) including a certain pixel and peripheral pixels around the certain pixel.

The image processing apparatus may further include at least one processor like a central processing unit (CPU) and a memory. All processing of the outline extractor 310, the blurrer 320, the image enhancer 330 and the image synthesizer 340 may be performed as the CPU executes programs stored in the memory.

The outline extractor 310 may extract outline region data from edge region data included in image data input to the image processing apparatus 300. The edge region data is data regarding pixels included in an edge region of an image and may include the coordinates and the pixel values (e.g., luminance) of the pixels included in the edge region. Furthermore, the outline region data is data regarding pixels included in an outline region of the image and may include the coordinates and the pixel values (e.g., luminance) of the pixels included in the outline region. Furthermore, the image data input to the image processing apparatus 300 may include texture region data, flat region data, etc. The texture region data and the flat region data may include the coordinates and the pixel values (e.g., luminance) of pixels included in the texture region and the flat region in the image data.

The outline extractor 310 may output an outline signal including information about the coordinates of the pixels included in the outline region data to the blurrer 320 and the image enhancer 330.

The blurrer 320 may perform a blurring processing on the outline region data. Furthermore, the blurrer 320 may output blurred image data obtained as a result of the blurring processing to the image synthesizer 340.

The image enhancer 330 may perform enhancement processing on pixels included in regions other than the outline region included in the image. Also, the image enhancer 330 may output the enhanced image data obtained as a result of the enhancement processing to the image synthesizer 340.

The image synthesizer 340 may combine the blurred image data input from the blurrer 320 with the enhanced image data input from the image enhancer 330. Also, the image synthesizer 340 may output image data generated as a result of the synthesis to a display device.

Meanwhile, according to another embodiment, the blurred image data may be input to the image enhancer 330 from the blurrer 320, and the blurred image data and the enhanced image data may be synthesized in the image enhancer 330. Likewise, the enhanced image data may be input to the blurrer 320 from the image enhancer 330, and the blurred image data and the enhanced image data may be synthesized in the blurrer 320. In this case, the image processing apparatus 300 may not include the image synthesizer 340.

Figure 4:
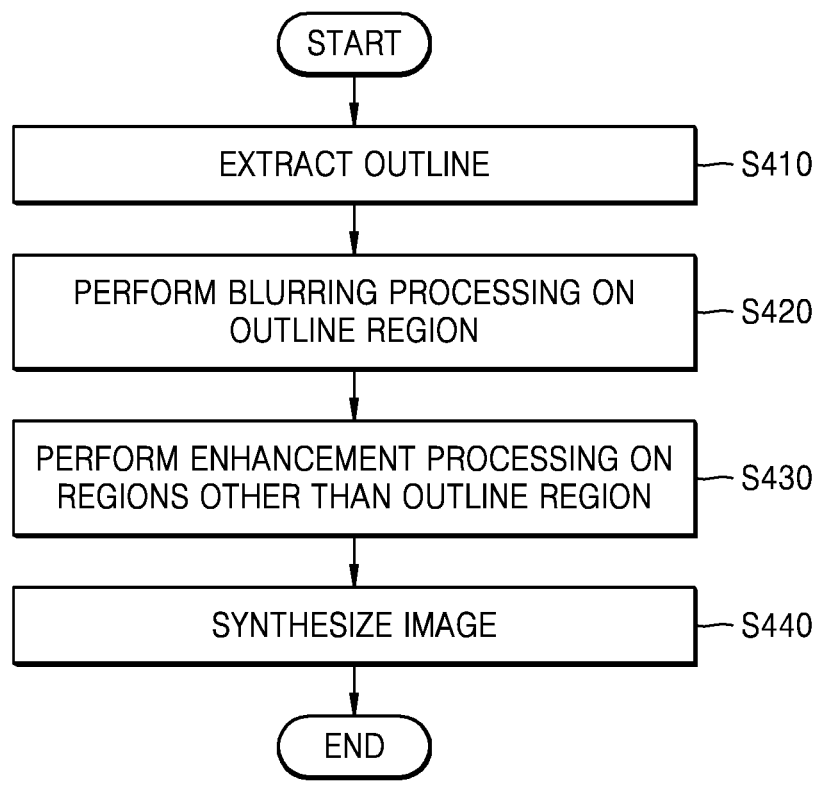
FIG. 4 is a flowchart for describing the image processing method according to an embodiment.

FIG. 4 is a flowchart for describing an image processing method according to the first embodiment.

In operation S410, the outline extractor 310 may extract an outline from an image. For example, the outline extractor 310 may extract outline region data from edge region data included in input image data. The outline extractor 310 may output an outline signal including the coordinates of pixels included in an outline region to the blurrer 320 and the image enhancer 330.

In operation S420, the blurrer 320 may perform blurring processing on the outline region. Furthermore, the blurrer 320 may output blurred image data obtained as a result of the blurring processing to the image synthesizer 340.

In operation S430, the image enhancer 330 may perform enhancement processing on regions other than the outline region in the image. Also, the image enhancer 330 may output the enhanced image data obtained as a result of the enhancement processing to the image synthesizer 440.

In operation S440, the image synthesizer 340 may synthesize the blurred image data with the enhanced image data. Furthermore, the image synthesizer 340 may output image data generated as a result of the synthesis to a display device and terminate image processing.

On the other hand, the processing of the operations S420 and S430 may be performed as stated above or in the reverse order.

In the image processing method according to the first embodiment, blurring is performed only on the outline region included in the edge region in the image, and thus the luminance gradation of the outline region may be increased. Accordingly, the image processing apparatus may perform image processing without impairing the stereoscopic impression or the distance impression of a displayed image.

Figure 5:
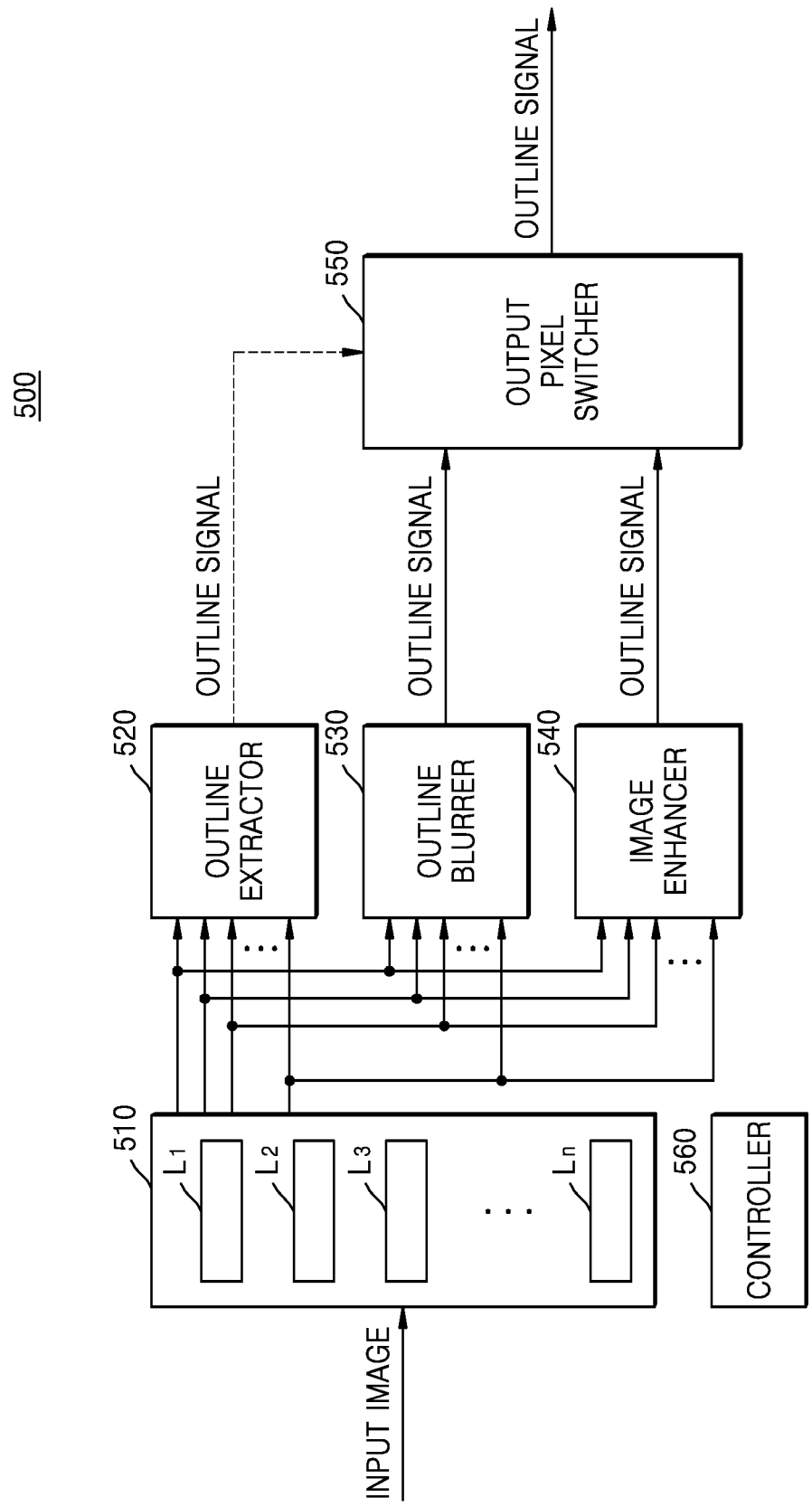
FIG. 5 is a block diagram showing an image processing apparatus according to an embodiment.

FIG. 5 is a block diagram showing an image processing apparatus 500 according to an embodiment.

Referring to FIG. 5, the image processing apparatus 500 according to an embodiment may include a line memory accommodating unit 510, an outline extractor 520, an outline blurrer 530, an image enhancer 540, an output pixel switcher 550, and a controller 560.

The controller 560 may include a CPU and a memory. As the CPU executes a program stored in the memory, all processing of the controller 560 may be executed.

Also, the program stored in the memory of the controller 560 may include computer-readable instructions for implementing the above-described processing. Also, the memory may include any storage device capable of storing, for example, the program or various information used for the processing of the controller 560.

The controller 560 may control the operation of each of components included in the image processing apparatus 500. In detail, the CPU included in the controller 560 may execute a program stored in the memory, thereby executing operations of the line memory accommodating unit 510, the outline extractor 520, the outline blurrer 530, the image enhancer 540, and the output pixel switcher 550.

The line memory accommodating unit 510 may include a plurality of line memories L1, L2, L3, . . . , and Ln each including static random access memory (SRAM) or the like. The line memory accommodating unit 510 may sequentially store image data input to the image processing apparatus 500 in the plurality of line memories L1, L2, L3, . . . , and Ln. In detail, when the image data input to the image processing apparatus 500 is full HD image data (that is, the resolution of the image data is 2K), one line memory L may store data for 1920 horizontally-arranged pixels (e.g., 8 bits of data per pixel). Also, the line memory accommodating unit 510 may perform line delaying processing on data stored in the plurality of line memories L1, L2, L3, . . . , and Ln.

The outline extractor 520, the outline blurrer 530 and the image enhancer 540 may load data of pixels needed for processing at the outline extractor 520, the outline blurrer 530, and the image enhancer 540 from the plurality of line memories L1, L2, L3, . . . , and Ln of the line memory accommodating unit 510.

The outline extractor 520 may extract outline region data from edge region data included in the image data input to the image processing apparatus 500 and output an outline signal including the coordinates of pixels in an outline region. Here, the outline signal may include the coordinates of pixels included in the image data and an outline level indicating whether the pixels are included in the outline region. According to the other example, the outline level includes a probability indicating the pixels being included in the outline region. An outline level may be calculated from the edge feature amount of a pixel. The outline extractor 520 may determine whether each pixel is included in the outline region by calculating the outline level thereof. Accordingly, the outline extractor 520 may identify the outline region from the input image data.

Figure 6:
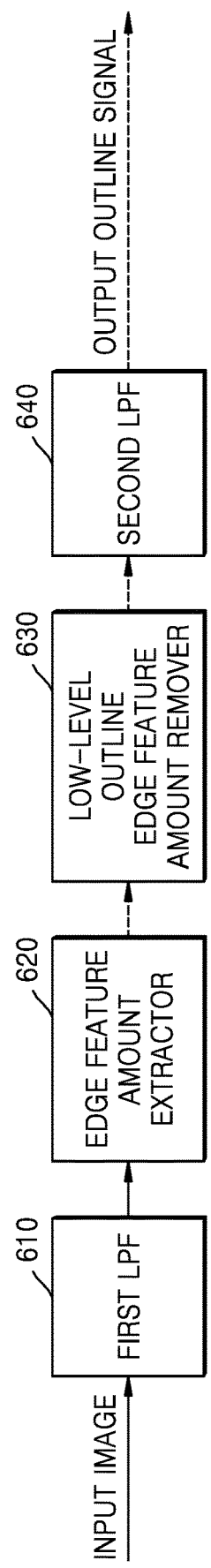
FIG. 6 is a block diagram showing an outline extractor according to an embodiment.

FIG. 6 is a block diagram showing an outline extractor according to an embodiment.

Referring to FIG. 6, the outline extractor 520 may include a first low-pass filter (LPF) 610, an edge feature amount extractor 620, a low-level outline edge feature amount remover 630, and a second LPF 640.

The first LPF 610 may perform blurring by removing high frequency components from image data obtained from the plurality of line memories L1, L2, L3, . . . , and Ln of the line memory accommodating unit 510. The first LPF 610 is a preprocessing filter in an outline extraction process and may blurred image data by removing high frequency components like noises, isolated points, and texture components from data read out from the line memory accommodating unit 510.

As the first LPF 610, for example, a finite impulse response (FIR) filter (N is a positive integer) whose kernel size is N×N may be used. As an example of the first LPF 610, FIG. 8 shows an FIR filter used for blurring according to an embodiment. Referring to FIG. 8, the FIR filter is a digital filter whose kernel size is 7×7 for processing one target pixel P1 and other peripheral pixels P2 around the target pixel P1.

However, it is merely an example, and a linear FIR filter or a non-linear FIR filter like a bilateral filter may be used as the first LPF 610.

The edge feature amount extractor 620 may extract an edge feature amount from the image data blurred by the first LPF 610. At this time, a Sobel filter may be used to extract the edge feature amount. FIG. 9 shows a Sobel filter used for edge feature amount extraction according to an embodiment. Referring to FIG. 9, the Sobel filter is a digital filter whose kernel size is 3×3. The filter shown on the left side of FIG. 9 indicates a Sobel filter used for extracting an edge feature amount in the horizontal direction, and the filter shown on the right side of FIG. 9 indicates a Sobel filter used for extracting an edge feature amount in the vertical direction. On the other hand, the Sobel filter is merely an example of a filter used for extracting an edge feature amount, and an edge feature amount may be extracted by using another digital filter.

Furthermore, the edge feature amount extractor 620 may output the edge feature amount to the low-level outline edge feature amount remover 630. The edge feature amount may be determined by using at least one or a combination of two or more of a Harr-like feature amount, a pixel difference feature amount, a histograms of oriented gradients (HOG) feature amount, an edge of orientation histogram (EOH) feature amount, and an Edglete feature amount.

The low-level outline edge feature amount remover 630 may determine whether the edge feature amount extracted by the edge feature amount extractor 620 is equal to or greater than a threshold value. The low-level outline edge feature amount remover 630 may determine a region whose edge feature amount is less than a critical value as a region less likely be an outline region and remove the corresponding region from candidates of the outline region. In detail, the low-level outline edge feature amount remover 630 may change the value of the edge feature amount of a region whose edge feature amount is less than the critical value and greater than a value smaller than a certain value. For example, the low-level outline edge feature amount remover 630 may change the value of the edge feature amount of the region whose the edge feature amount is less than the critical value to zero. Furthermore, the low-level outline edge feature amount remover 630 may output the edge feature amount changed to a value smaller than a certain value to the second LPF 640.

The low-level outline edge feature amount remover 630 may determine whether the number of pixels included in an edge region having an edge feature amount equal to or greater than the critical value is equal to or greater than a pre-set value. When the number of pixels included in an edge region having an edge feature amount equal to or greater than the critical value is less than the pre-set value, the low-level outline edge feature amount remover 630 may determine that the region is less likely be an outline region and remove the corresponding region from candidates of the outline region. In detail, the low-level outline edge feature amount remover 630 may change the value of the edge feature amount of the corresponding region to a value smaller than a certain value (e.g., zero). For example, the value of the edge feature amount may be set to zero. Furthermore, the low-level outline edge feature amount remover 630 may output the changed feature amount to the second LPF 640.

When the number of pixels included in an edge region having an edge feature amount equal to or greater than the critical value is equal to or greater than the pre-set value, the low-level outline edge feature amount remover 630 may determine the corresponding region as a region likely be an outline region and outputs the edge feature amount of the corresponding region to the second LPF 640.

The second LPF 640 is a post-processing filter in an outline extraction process and may blurred a feature amount changed to a value smaller than the certain value input from the low-level outline edge feature amount remover 630 and an edge feature amount input from the low-level outline edge feature amount remover 630.

As a result, as the value of the edge feature amount of a region including pixels not related to the outline is reduced, side effects like the spatial discontinuity and the temporal discontinuity between enhanced pixels and blurred pixels may be reduced during the synthesis of enhanced image data and blurred image data described below. Here, by the second LPF 640, the feature amount of a blurred pixel (including the edge feature amount) may be used as an outline level. The second LPF 640 may output an outline signal including the coordinates of a pixel and the outline level of the corresponding pixel to the output pixel switcher 550. As the second LPF 640, for example, an FIR filter whose kernel size is N×N as shown in FIG. 8 may be used.

FIG. 7 is a block diagram showing an outline extractor according to another embodiment.

Referring to FIG. 7, the outline extractor 520 may include a first LPF 710, an edge feature amount extractor 720, and a second LPF 730. The operations of the first LPF 710, the edge feature amount extractor 720, and the second LPF 730 of FIG. 7 may correspond to those of the first LPF 610, the edge feature amount extractor 620, and the second LPF 640 described above with reference to FIG. 6. In other words, the outline extractor 520 shown in FIG. 7 may not perform an operation for removing an edge region less likely be an outline region from candidates of the outline region.

Figure 10:
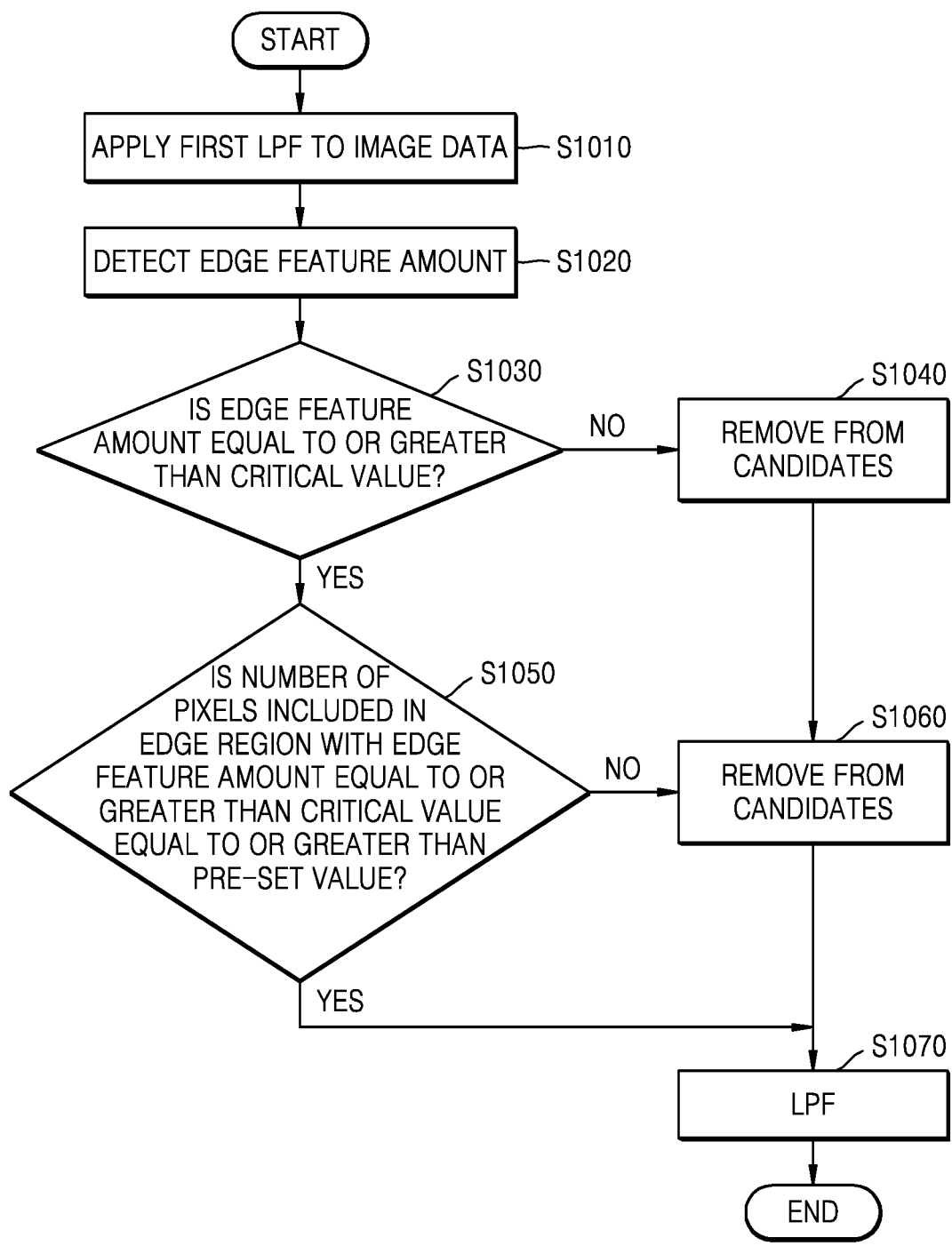
FIG. 10 is a flowchart of a method of extracting an outline region, according to an embodiment.

FIG. 10 is a flowchart of a method of extracting an outline region according to an embodiment.

In operation S1010, an image processing apparatus may apply a first LPF to image data. In detail, the image processing apparatus may perform blurring by removing high frequency components from data obtained from a plurality of line memories L1, L2, L3, . . . , and Ln of a line memory accommodating unit. A linear FIR filters or a non-linear FIR filter like a bilateral filter may be used as the first LPF.

In operation S1020, the image processing apparatus may extract an edge feature amount from the image data blurred by the first LPF. For the extraction of the edge feature amount, for example, a Sobel filter may be used.

In operation S1030, the image processing apparatus may determine whether the extracted edge feature amount is equal to or greater than a critical value.

In operation S1040, when the edge feature amount is less than the critical value, the image processing apparatus may determine that the edge region having the corresponding edge feature amount is less likely be an outline region and remove the corresponding edge region from candidates of the outline region. In detail, the image processing apparatus may change the value of the edge feature amount to a value (e.g., zero) smaller than a certain value.

In operation S1050, when the edge feature amount is equal to or greater than the critical value, the image processing apparatus may determine whether the number of pixels included in the edge region having the edge feature amount equal to or greater than the critical value is equal to or greater than a pre-set value.

In operation S1060, when the number of pixels included in an edge region having an edge feature amount equal to or greater than the critical value is less than the pre-set value, the image processing apparatus may determine that the region is less likely be an outline region and remove the corresponding edge region from candidates of the outline region. In detail, the image processing apparatus may change the value of the edge feature amount to an edge feature amount (e.g., zero) smaller than a certain value.

In operation S1070, the image processing apparatus may blur the edge feature amount and the changed edge feature amount of the edge region, which has the edge feature amount equal to or greater than the critical value and is determined in operation S1060 as an edge region including the number of pixels equal to or greater than the pre-set value. As a result, as the value of the edge feature amount of a region including pixels not related to the outline becomes smaller, side effects like the spatial discontinuity and the temporal discontinuity between enhanced pixels and blurred pixels may be reduced during the image synthesis of enhanced image data and blurred image data described below.

Also, through the processing of the above-described operations S1030 to S1060, it may be determined that, when the variance of an edge feature amount is high, an edge region having the corresponding edge feature amount is less likely be an outline region. The processing from operations S1030 to S1060 are processing for extracting data of an edge region that satisfies the Feature 2 of the outline region described above as outline region data.

Figure 11:
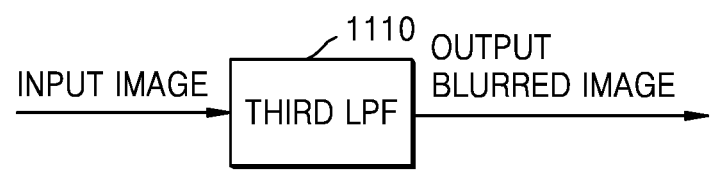
FIG. 11 is a block diagram showing an outline blurrer according to an embodiment.

Referring back to FIG. 5, the outline blurrer 530 may perform a blurring processing on the data loaded from the plurality of line memories L1, L2, L3, . . . , and Ln of the line memory accommodating unit 510. FIG. 11 is a block diagram showing the outline blurrer 530 according to an embodiment. The outline blurrer 530 may include a third LPF 1110, as shown in FIG. 11.

The third LPF 1110 may perform blurring by removing high frequency components from data loaded from the line memory accommodating unit 510. For example, like the first LPF 610 and the second LPF 640 described above, an FIR filter whose kernel size is N×N may be sued as the third LPF 1110. Furthermore, the third LPF 1110 may output blurred image data to the output pixel switcher 550. On the other hand, digital filters used as the first LPF 610, the second LPF 640, and the third LPF 1110 may be different from one another.

Figure 12:
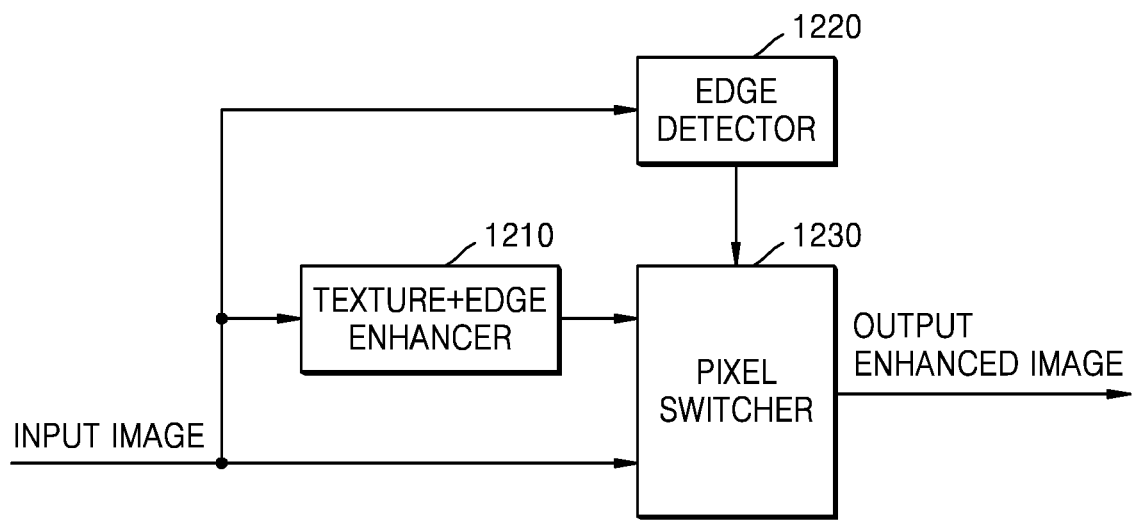
FIG. 12 is a block diagram showing an image enhancer according to an embodiment.

Referring back to FIG. 5, the image enhancer 540 may perform image enhancement processing on data loaded from the plurality of line memories L1, L2, L3, . . . , and Ln of the line memory accommodating unit 510. In detail, the image enhancer 540 may perform different image enhancement processing on data regarding an edge region data and data regarding regions other than the edge region. FIG. 12 is a block diagram showing the image enhancer 540 according to an embodiment.

Referring to FIG. 12, the image enhancer 540 may include a texture+edge enhancer 1210, an edge detector 1220, and a pixel switcher 1230.

The texture+edge enhancer 1210 may perform an image enhancement processing on data loaded from the plurality of line memories L1, L2, L3, . . . , and Ln of the line memory accommodating unit 510. In detail, the texture+edge enhancer 1210 may perform an image enhancement processing by using an FN filter whose kernel size is N×N. The image enhancement process performed by the texture+edge enhancer 1210 may be, for example, an unsharp masking process. The texture+edge enhancer 1210 may output image data subjected to the image enhancement processing to the pixel switcher 1230.

The edge detector 1220 may calculate an edge feature amount from data loaded from the plurality of line memories L1, L2, L3, . . . , and Ln of the line memory accommodating unit 510 by using, for example, a Sobel filter. Next, the coordinates of a pixel and the edge feature amount of the corresponding pixel may be output to the pixel switcher 1230. The edge detector 1220 may output the edge feature amount to the pixel switcher 1230, and thus the pixel switcher 1230 may switch data used for synthesizing enhanced image data according to the value of the corresponding edge feature amount. Accordingly, the pixel switcher 1230 may perform different image enhancement processing for an edge region, a texture region, and a flat region included in image data.

The pixel switcher 1230 may switch image data output to the output pixel switcher 550 from each of the edge region, the texture region, and the flat region based on the coordinates and the edge feature amounts of pixels input from the edge detector 1220. In detail, the pixel switcher 1230 may normalize the feature amounts of pixels input from the edge detector 1220. For example, when the image data includes 8-bit data per pixel, the pixel switcher 1230 may normalize the feature amount to a value from about 0.0 to about 1.0. Here, the value of a normalized feature amount will be denoted by Gain.

Also, image-enhanced image data input from the texture+edge enhancer 1210 to the pixel switcher 1230 will be denoted as Penh. Also, data loaded by the image enhancer 540 from the plurality of line memories L1, L2, L3, . . . , and Ln of the line memory accommodating unit 510 will be denoted as Pin. At this time, the pixel switcher 1230 may generate image-enhanced image data by performing an image synthesis by calculating Pout for each pixel according to Equation 1 below.

$$Pout = Gain * Penh + (1.0 - Gain) * Pin \quad \text{[Equation 1]}$$

Accordingly, the pixel switcher 1230 may perform an image synthesis using a relatively large amount of image-enhanced image data input from the texture+edge enhancer 1210 for an edge region and a texture region having relatively large feature amounts and perform an image synthesis by using a relatively large amount of data (data not subjected to an image enhancement processing) loaded from the plurality of line memories L1, L2, L3, . . . , and Ln of the line memory accommodating unit 510. In other words, the image enhancer 540 may perform different image enhancement processing on data regarding an edge region data and data regarding regions other than the edge region.

Furthermore, the pixel switcher 1230 may output image-synthesized image data to the output pixel switcher 550 as enhanced image data. Furthermore, the pixel switcher 1230 may use a feature quantity as the Gain of Equation 1 as-is without normalization. For example, the pixel switcher 1230 may divide the entire Equation 1 by 256 when the value of the feature amount is from about 0 to about 255.

The output pixel switcher 550 may switch data regarding pixels output from an outline region and regions other than the outline region including an edge region, a texture region, and a flat region to a display device based on an outline signal input from the outline extractor 520. In detail, the output pixel switcher 550 may switch data used for a image synthesis based on the outline level of pixels included in the outline signal input from the outline extractor 520. In more detail, the output pixel switcher 550 may first normalize the outline level of a pixel input from the outline extractor 520 to a value from about 0.0 to about 1.0. Here, the value of the normalized outline level will be denoted by a.

Also, blurred image data input from the outline blurrer 530 to the output pixel switcher 550 will be denoted by A, enhanced image data input from the image enhancer 540 to the output pixel switcher 550 will be denoted by B. At this time, the output pixel switcher 550 may generate output image data by performing image synthesis by calculating C for each pixel according to Equation 2 below.

$$C = \alpha * A + (1.0 - \alpha) * B \quad \text{[Equation 2]}$$

Accordingly, the output pixel switcher 550 may perform an image synthesis using a relatively large amount of blurred image data input from the outline blurrer 530 for an outline region with a high outline level and perform an image synthesis by using a relatively large amount of image-enhanced image data input from the image enhancer 540 for regions other than the outline region. Furthermore, the output pixel switcher 550 may output synthesized image data to a display device as output image data. Furthermore, the output pixel switcher 550 may use an outline level as the value of a of Equation 2 as-is without normalization. When normalization is not performed (e.g., when the value of the outline level is from about 0 to about 255), the entire Equation 2 may be divided by 256 and used for image synthesis.

Hereinafter, an image to which an image processing according to an embodiment is applied will be compared with an image to which a previous image processing is applied with reference to FIGS. 13 to 18.

Figure 13:
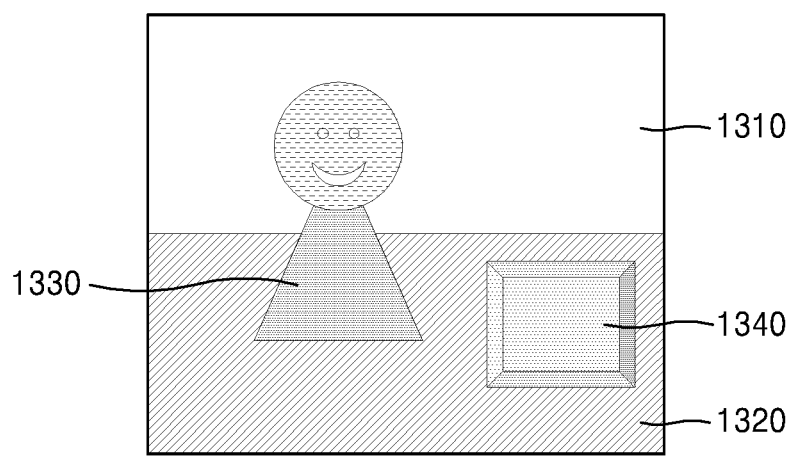
FIG. 13 is a diagram showing an example of an input image.

FIG. 13 is a diagram showing an example of an input image. In the input image shown in FIG. 13, sky 1310, grass 1320, a person 1330, and a box 1340 are displayed.

Figure 14:
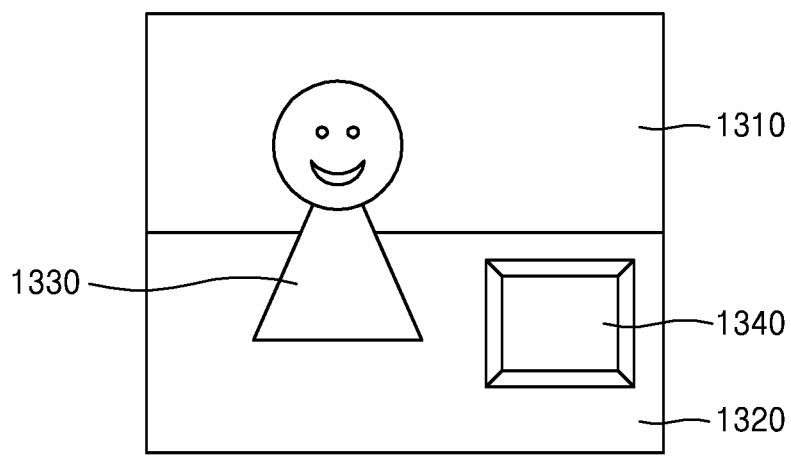
FIG. 14 is a diagram showing an edge region included in the input image shown in FIG. 13.
Figure 15:
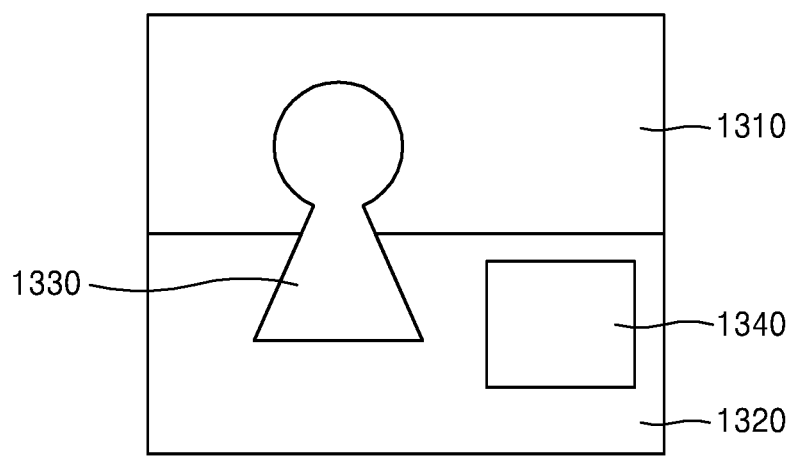
FIG. 15 is a diagram showing an outline region included in the input image shown in FIG. 13.
Figure 16:
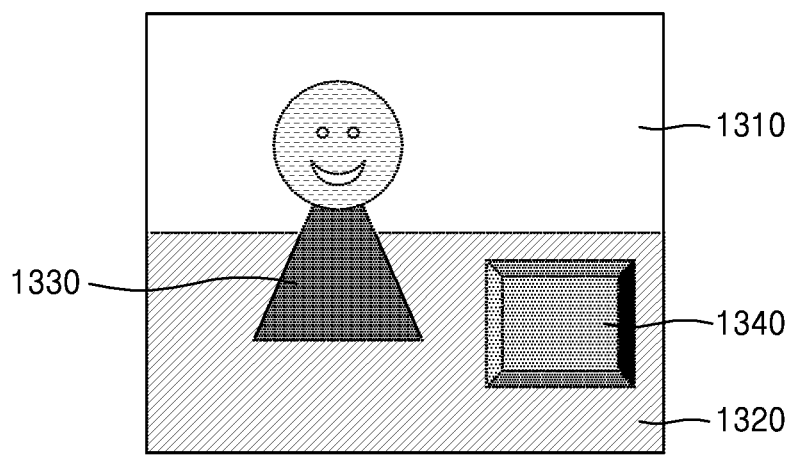
FIG. 16 is a diagram showing a texture region included in the input image shown in FIG. 13.

FIG. 14 is a diagram showing an edge region included in the input image shown in FIG. 13. FIG. 15 is a diagram showing an outline region included in the input image shown in FIG. 13. In the present embodiment, the outline region may be regions corresponding to the boundaries of the sky 1310, the grass 1320, the person 1330, and the box 1340. FIG. 16 is a diagram showing a texture region included in the input image shown in FIG. 13.

Figure 17:
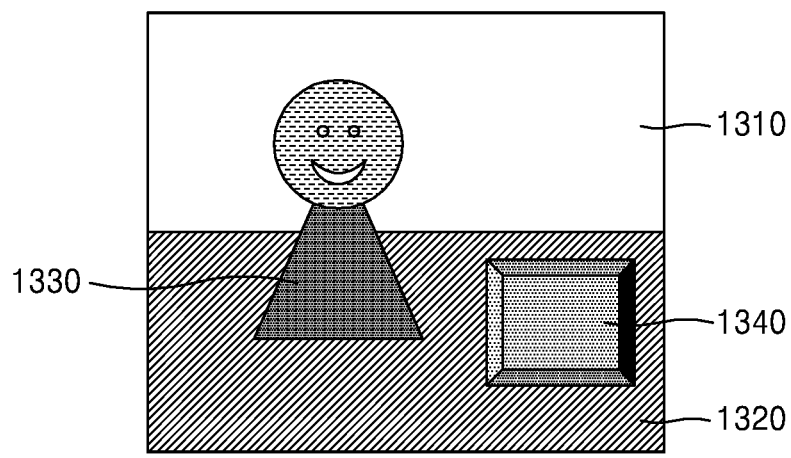
FIG. 17 is a diagram showing an image output from a previous image processing apparatus.

FIG. 17 is a diagram showing an image output from a previous image processing apparatus. In the previous image processing apparatus, the edge region shown in FIG. 14 and the outline region shown in FIG. 15 are not distinguishable, and the outline region is also enhanced in the same manner as the other edge regions. Therefore, the boundaries between the sky 1310, the grass 1320, the person 1330, and the box 1340 are unnaturally enhanced as shown in FIG. 17. In detail, since the contrast of the boundaries of the sky 1310, the grass 1320, the person 1330, and the box 1340 is too strong in an image output by the previous image processing apparatus, the image appears as 2D images of the sky 1310, the grass 1320, the person 1330, and the box 1340 overlapping one another, and thus the three-dimensional impression or sense of depth is lost.

Figure 18:
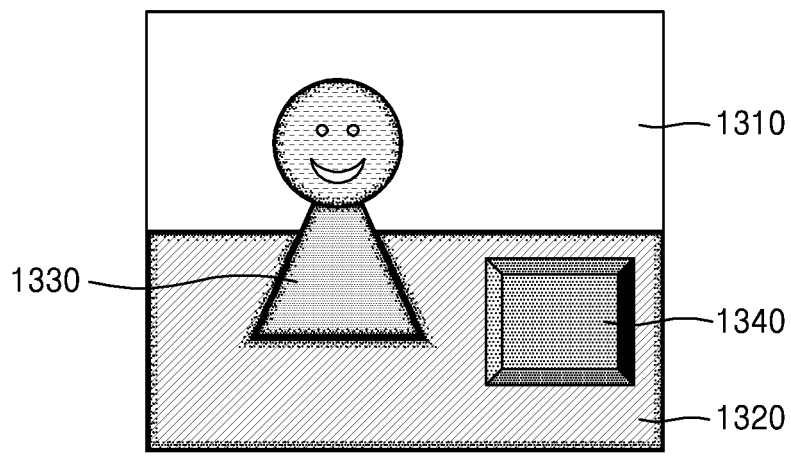
FIG. 18 is a diagram showing an image output from an image processing apparatus according to an embodiment.

FIG. 18 is a diagram showing an image output from an image processing apparatus according to an embodiment. In an image processing apparatus according to an exemplary embodiment, an image synthesis may be performed using a relatively large amount of blurred image data for an outline region with a high outline level and an image synthesis may be performed by using a relatively large amount of image-enhanced image data input from the image enhancer 540 for regions other than the outline region. Accordingly, as shown in FIG. 18, the boundaries of the sky 1310, the grass 1320, the person 1330, and the box 1340 may be blurred and the luminance gradations of the boundaries may be increased. Accordingly, the image processing apparatus according to an embodiment may impart the stereoscopic impression and the distance impression to the boundaries of the sky 1310, the grass 1320, the person 1330, and the box 1340.

As described above, the image processing apparatus according to an embodiment may extract an outline region from an edge region of input image data and synthesize images by using blurred image data for the outline region. Therefore, the outline region may be blurred, and thus the luminance gradation of the outline region may be increased. In other words, the image processing apparatus according to an embodiment may impart the stereoscopic impression and the distance impression to the outline region.

Furthermore, since the image processing apparatus synthesizes an image using image-enhanced image data for regions other than the outline region of the image data, an image enhancement processing may appropriately performed for the regions other than the outline region. Furthermore, the image processing apparatus may perform different image enhancement processing on data regarding an edge region data and data regarding regions other than the edge region. Accordingly, for regions other than an outline region of input image data, images are synthesized by using image-enhanced image data generated by performing different image enhancement processing at least for an edge region and regions other than the edge region, and thus image enhancement processing suitable for the edge region and the regions other than the edge region may be performed for regions other than the outline region.

Figure 19:
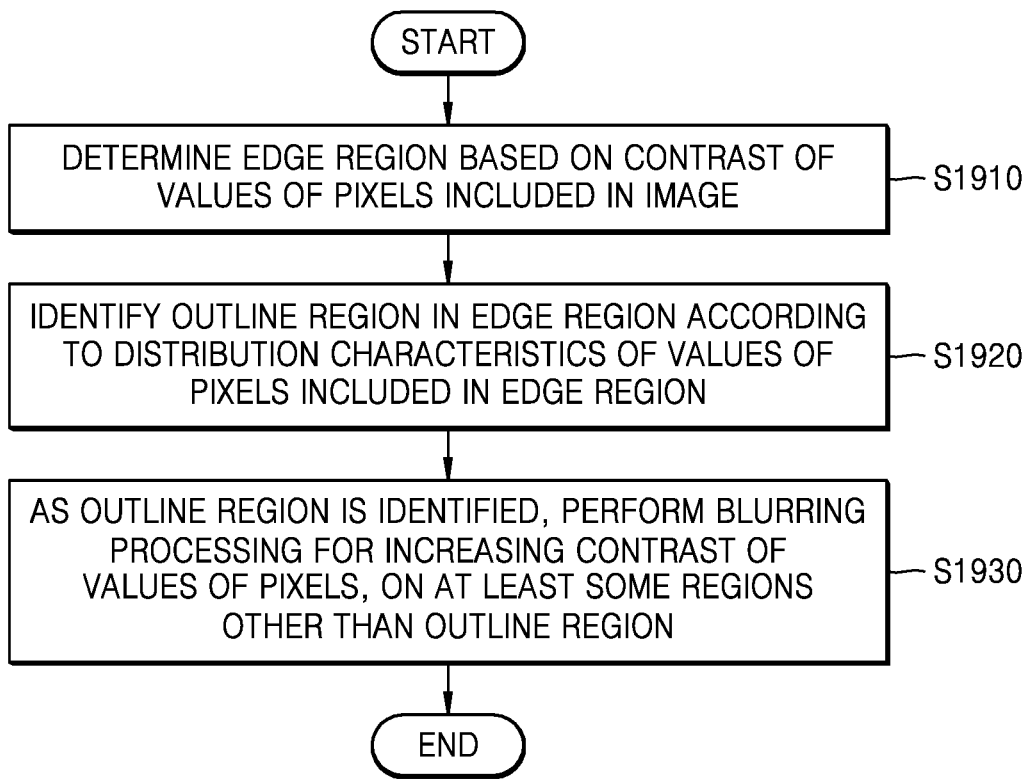
FIG. 19 is a flowchart of an image processing method according to an embodiment.

FIG. 19 is a flowchart of an image processing method according to a second embodiment.

In operation S1910, an image processing apparatus may determine an edge region whose contrast of values of pixels included therein is equal to or greater than a pre-set value in an image.

Meanwhile, operation S1910 may correspond to operation S210 described above with reference to FIG. 2.

In operation S1920, the image processing apparatus may identify an outline region within the edge region according to the distribution characteristics of the values of the pixels included in the edge region.

Meanwhile, operation S1920 may correspond to operation S220 described above with reference to FIG. 2.

In operation S1930, as the outline region is identified, the image processing apparatus may perform a blurring processing that increases the contrast of the values of pixels to at least some of regions other than the outline region. In this case, the image processing apparatus may perform the same enhancement processing on all regions other than the outline region or may perform different enhancement processing depending on the characteristics of the respective regions. For example, the image processing apparatus may perform a first enhancement processing for an edge region not included in the outline region and perform a second enhancement processing for regions not included in the edge region.

Figure 20:
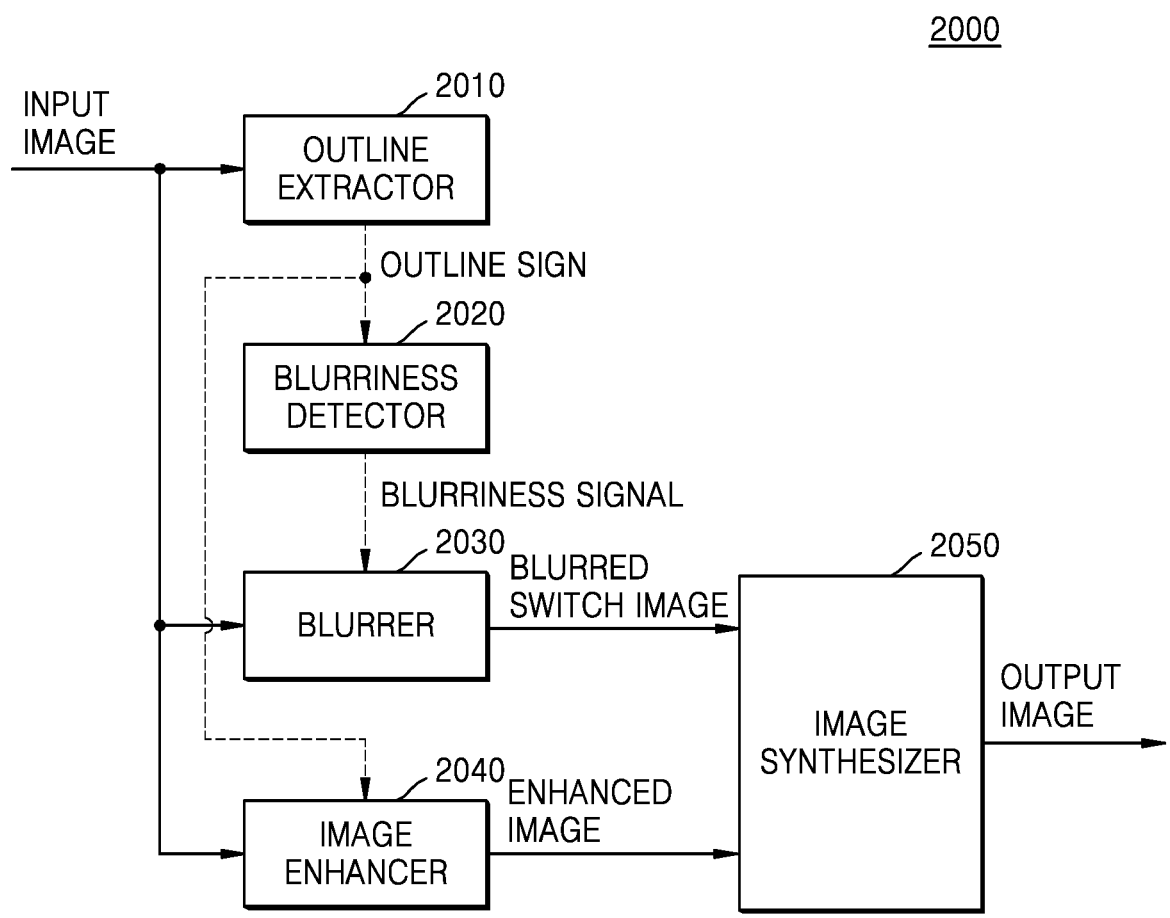
FIG. 20 is a block diagram showing the image processing apparatus according to an embodiment.

FIG. 20 is a block diagram showing an image processing apparatus 2000 according to the second embodiment.

Referring to FIG. 20, the image processing apparatus 2000 may include an outline extractor 2010, a blurriness detector 2020, a blurrer 2030, an image enhancer 2040, and an image synthesizer 2050. The outline extractor 2010, the image enhancer 2040 and the image synthesizer 2050 may correspond to the outline extractor 310, the image enhancer 330, and the image synthesizer 340 described above with reference to FIG. 3, respectively. Therefore, the descriptions of the outline extractor 2010, the image enhancer 2040, and the image synthesizer 2050 will be omitted.

Furthermore, the image processing apparatus 2000 may include a CPU and a memory. As the CPU executes a program stored in the memory, all processing of the outline extractor 2010, the blurriness detector 2020, the blurrer 2030, the image enhancer 2040, and the image synthesizer 2050 may be executed.

The outline extractor 2010 may detect the blurriness of data. Furthermore, the outline extractor 2010 may output a blurriness signal indicating whether the blurriness of an outline region is higher than a certain value to the blurrer 2030. Here, the blurriness may be determined based on, for example, differential statistics of the values of pixels included in image data input to the image processing apparatus 2000.

The blurrer 2030 may perform blurring processing on outline region data whose blurriness is less than or equal to a certain value. Furthermore, the blurrer 2030 may not perform blurring processing on outline region data whose blurriness is higher than the certain value. Furthermore, the blurrer 2030 may output blurred data and data that is not blurred to the image synthesizer 2050.

Figure 21:
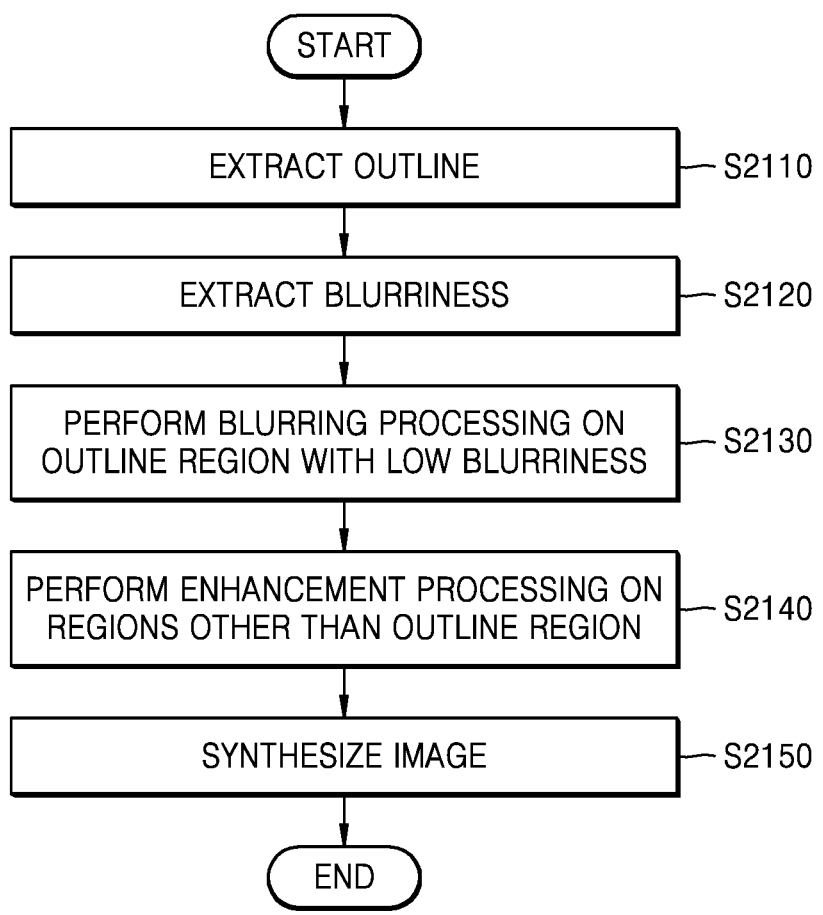
FIG. 21 is a flowchart for describing the image processing method according to an embodiment.

Next, an image processing method according to the second embodiment will be described with reference to FIG. 21.

In operation S2110, the image processing apparatus may extract outline region data from edge region data included in input image data.

In operation S2120, the image processing apparatus may detect the blurriness of the outline region data. The image processing apparatus may determine whether the blurriness of an outline region is higher than a certain value.

In operation S2130, the image processing apparatus may perform a blurring processing on the outline region data whose blurriness is equal to or less than the certain value. The image processing apparatus may obtain blurriness-switched image data by synthesizing blurred data and data that is not blurred.

In operation S2140, the image processing apparatus may perform image enhancement processing on data regarding regions other than the outline region included in the image data, thereby obtaining enhanced image data.

In operation S2150, the image processing apparatus may combine the blurriness-switched image data with the enhanced image data. Also, the image processing apparatus may provide output image data generated as a result of the synthesis to a display device.

On the other hand, operation S2140 may be performed before operation S2120, and the processing of operation S2140, the processing of operation S2120, and the processing of operation S2130 may be performed simultaneously.

In the image processing apparatus 2000 and the image processing method according to the second embodiment described above, not only the same effect as the image processing method according to the second embodiment may be obtained, but also an image enhancement processing may be performed for regions included in an edge region in input image data other than an outline region. In other words, an image enhancement processing may not be performed for an outline region. Accordingly, the image processing method according to the second embodiment may prevent an image from being displayed as an unnatural image due to loss of the stereoscopic impression or the distance impression caused by performing an image enhancement processing on outline regions.

Also, in the image processing method according to the second embodiment, a blurring processing may be performed on outline regions with low blurriness in input image data. Accordingly, the luminance gradation in an outline region with low blurriness and without the stereoscopic impression and the distance impression may be increased, and the stereoscopic impression and the distance impression may be imparted thereto. On the other hand, in input image data, an outline region with sufficient blurriness is not blurred, thereby preventing the outline region from being unnecessarily blurred.

Hereinafter, with reference to FIGS. 22 to 30, the image processing method according to the second embodiment will be described in more detail.

Figure 22:
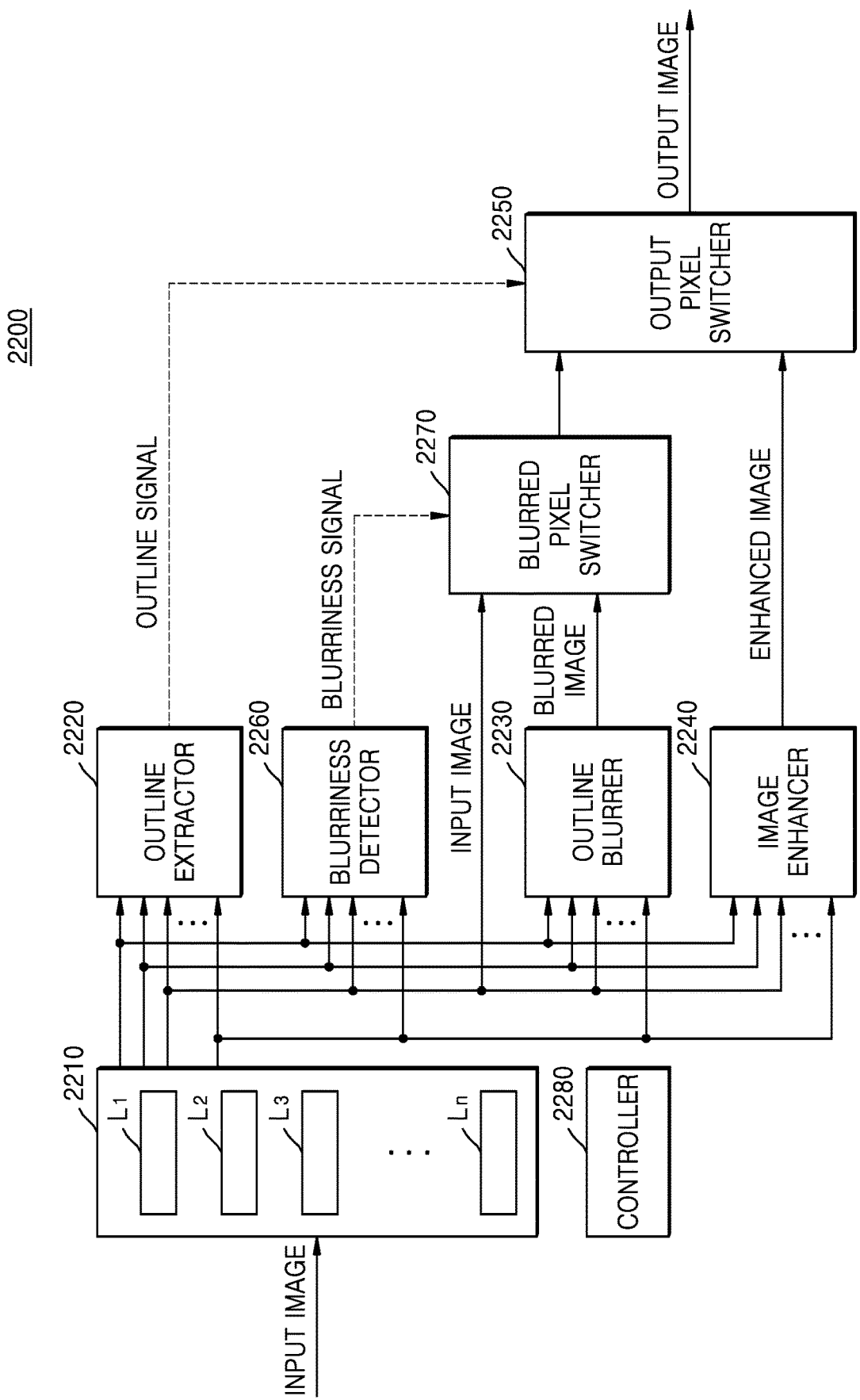
FIG. 22 is a block diagram showing the image processing apparatus according to an embodiment.

FIG. 22 is a block diagram showing the image processing apparatus 2000 according to the second embodiment.

The image processing apparatus 2200 includes a line memory accommodating unit 2210, an outline extractor 2220, an outline blurrer 2230, an image enhancer 2240, an output pixel switcher 2250, a blurriness detector 2260, a blurred pixel switcher 2270, and a controller 2280. Here, the line memory accommodating unit 2210, the outline extractor 2220, the outline blurrer 2230, the image enhancer 2240, and the output pixel switcher 2250 may correspond to the line memory accommodating unit 510, the outline extractor 520, the outline blurrer 530, the image enhancer 540, and output pixel switcher 550, respectively.

The blurriness detector 2260 may detect the blurriness of image data input to the image processing apparatus 2200. In detail, the blurriness detector 2260 may calculate derivatives of the pixel values included in data loaded from a plurality of line memories L1, L2, L3, . . . , and Ln of the line memory accommodating unit 2210. The blurriness detector 2260 may output a blurriness signal, which indicates whether the blurriness of each region included in an input image is higher than a certain value, based on the statistics of the derivatives, to the blurred pixel switcher 2270.

Figure 23:
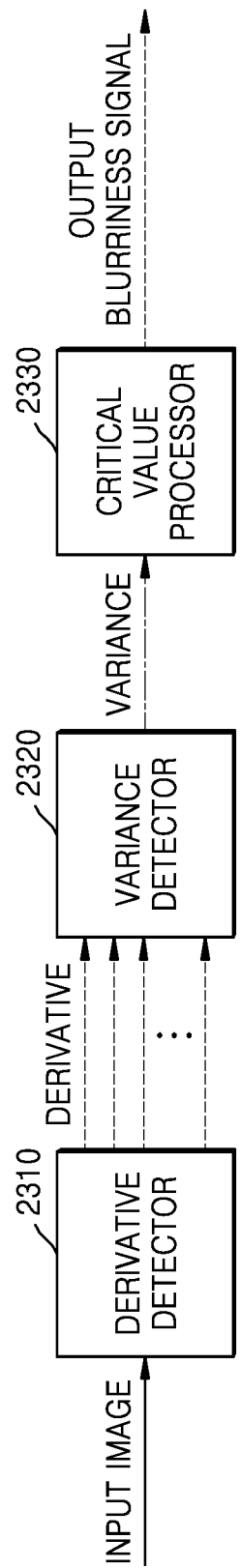
FIG. 23 is a block diagram of a blurriness detector according to an embodiment.

FIG. 23 is a block diagram of a blurriness detector according to an embodiment.

Referring to FIG. 23, the blurriness detector may include a derivative detector 2310, a variance detector 2320, and a critical value processor 2330. Operations of the derivative detector 2310, the variance detector 2320, and the critical value processor 2330 will be described below with reference to FIG. 26.

Figure 26:
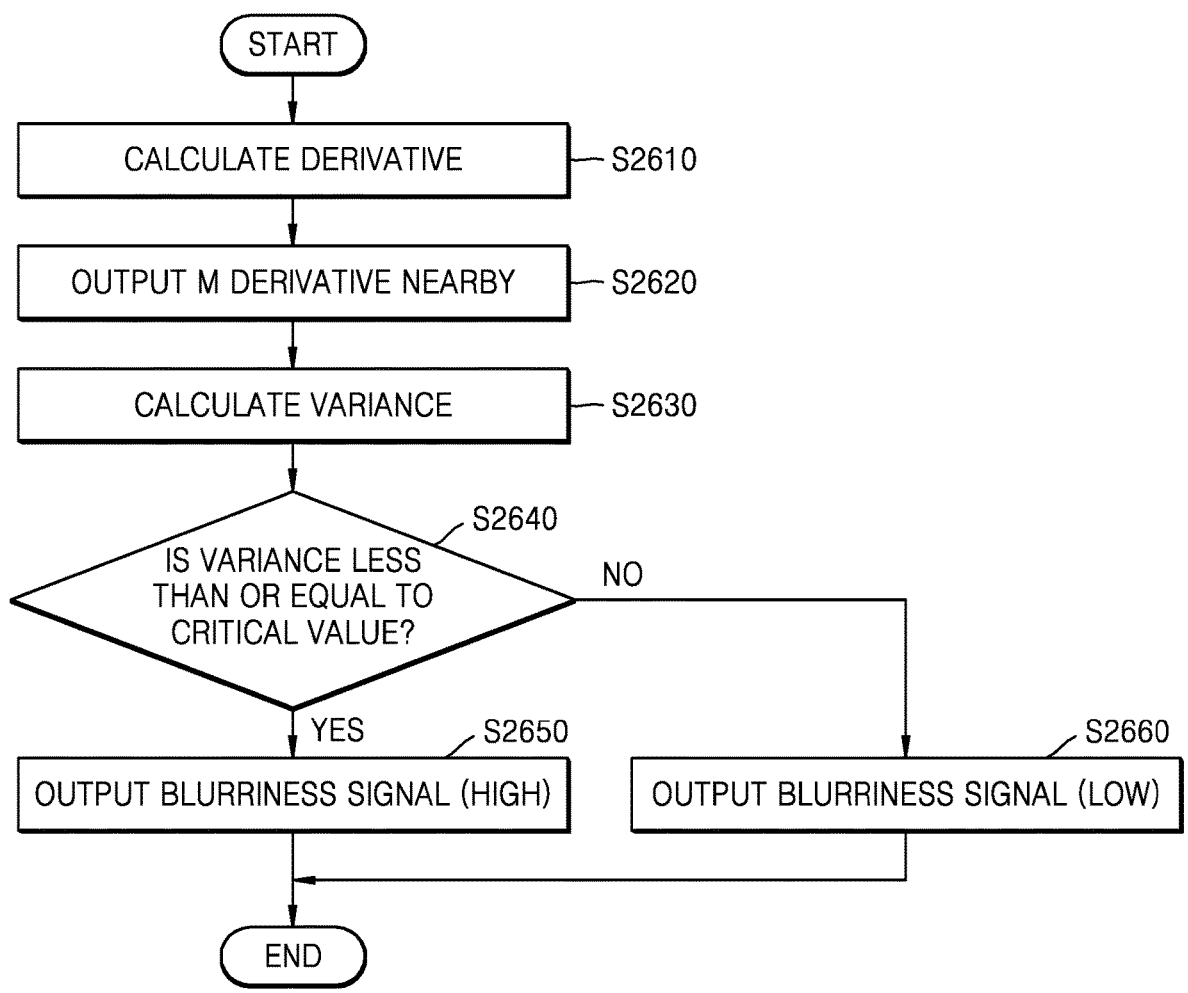
FIG. 26 is a flowchart for describing the operation of the blurriness detector of FIG. 23.

FIG. 26 is a flowchart for describing the operation of the blurriness detector described above with reference to FIG. 23.

In operation S2610, the derivative detector 2310 may calculate derivatives of the pixel values of pixels included in data loaded from a line memory accommodating unit. Here, the derivatives may be calculated by a first-order derivative or a second-order derivative of the pixel value of each pixel.

In operation S2620, the derivative detector 2310 may collect M pixel derivatives (M is a positive integer) nearby a pixel and output the M pixel derivatives to the variance detector 2320. In other words, per certain region of an input image, the derivative detector 2310 may output derivatives of pixels included in the certain region to the variance detector 2320.

In operation S2630, the variance detector 2320 may calculate the variance of the derivatives of pixels included in the certain region input from the derivative detector 2310. The variance detector 2320 may output a calculated value to the critical value processor 2330 as a variance.

In operation S2640, the critical value processor 2330 may determine whether the variance input from the variance detector 2320 is less than or equal to a critical value.

In operation S2650, the critical value processor 2330 may output a blurriness signal indicating that the blurriness of the certain region is high to the planarized pixel switcher 2270 when an input variance is less than or equal to the critical value.

In operation S2660, the critical value processor 2330 may output a blurriness signal indicating that the blurriness of the certain region is low to the planarized pixel switcher 2270.

Figure 28:
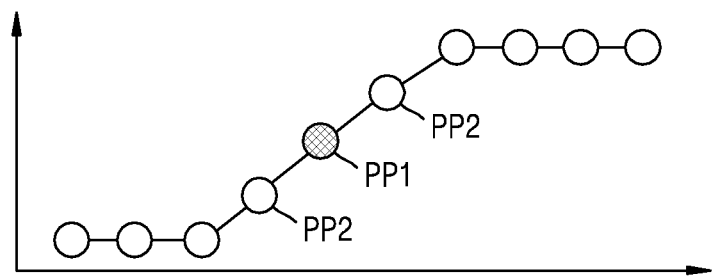
FIGS. 28 and 29 are graphs showing pixel values of pixels arranged side-by-side along a horizontal line of an input image.
Figure 29:
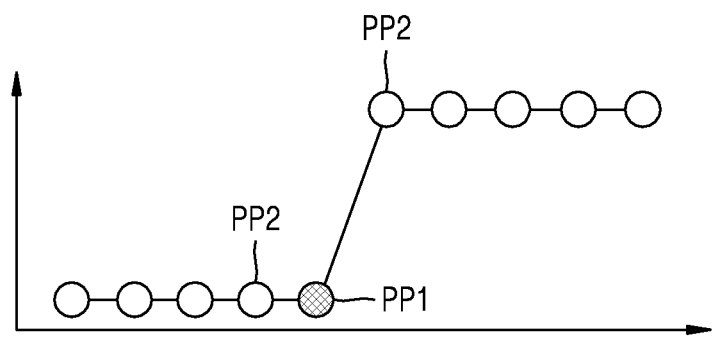

Here, the critical value used by the critical value processor 2330 will be described with reference to FIGS. 28 and 29. FIGS. 28 and 29 are graphs showing pixel values of pixels arranged side-by-side along a horizontal line of an input image. In the graph, the vertical axis represents the pixel values, and the horizontal axis represents the pixel positions. Furthermore, it is assumed in FIGS. 28 and 29 that the resolution of an input image is 8K, for example.

Referring to FIG. 28, the pixel values of pixels arranged side-by-side along the horizontal line gradually change over plots PP2 of four peripheral pixels around a plot PP1 of a target pixel. In other words, the resolution of change of the pixel value is 2K. The 2K resolution change of the pixel values is a blurred change in an 8K resolution input image. In other words, the region may be determined as being highly blurred.

Referring to FIG. 29, the pixel values of pixels arranged side-by-side along the horizontal line abruptly change over the plots PP2 of peripheral pixels around the plot PP1 of the target pixel. In other words, the resolution of change of the pixel value is 8K. The 8K resolution change of the pixel values is not a blurred change in an 8K resolution input image. In other words, the region may be determined as a region with low blurriness. As described above with reference to FIGS. 28 and 29, the critical value used by the critical value processor 2330 may be determined based on the resolution of the input image or the like. For example, when a certain region including M pixels adjacent to one another has a pixel value change of resolution equal to the resolution of the input image, the critical value may be determined, such that the critical value processor 2330 outputs a blurriness signal indicating that the blurriness of the certain region is low to the blurred pixel switcher 2270.

Figure 24:
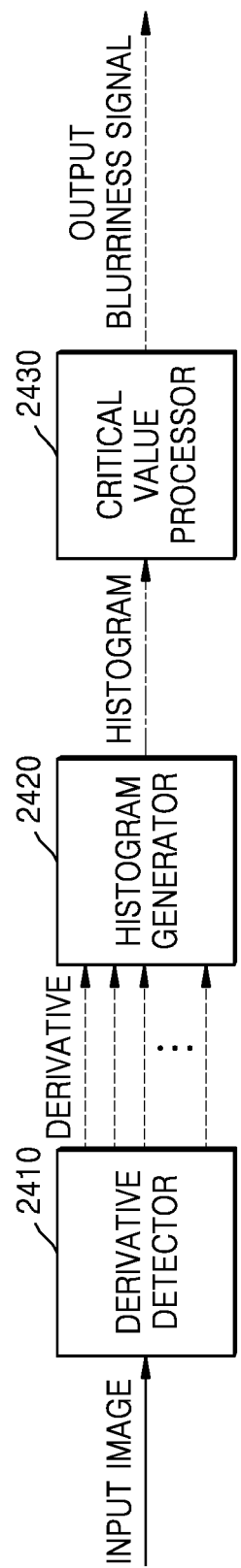
FIG. 24 is a block diagram showing a blurriness detector according to an embodiment.

FIG. 24 is a block diagram showing a blurriness detector according to another embodiment.

Referring to FIG. 24, the blurriness detector may include a derivative detector 2410, a histogram generator 2420, and a critical value processor 2430. Since the derivative detector 2410 corresponds to the derivative detector 2310 described above with reference to FIG. 23, description thereof will be omitted.

The histogram generator 2420 may generate a histogram of derivatives of the values of pixels included in a certain region input from the derivative detector 2410 and output the generated histogram to the critical value processor 2430. Here, the horizontal axis of the histogram represents the derivatives of the pixel value, and the vertical axis represents the frequency of the derivatives.

The critical value processor 2430 may determine the blurriness of the certain region based on the histogram input from the histogram generator 2420. For example, when the cumulative frequency of a bin BIN smaller than a certain critical value is greater than a cumulative frequency of a bin BIN greater than the certain critical value, the critical value processor 2430 may output a blurriness signal, indicating that the blurriness of the certain region is high, to the blurred pixel switcher 2270. For example, when the cumulative frequency of the bin BIN greater than the certain critical value is greater than the cumulative frequency of the bin BIN smaller than the certain critical value, the critical value processor 2430 may output a blurriness signal indicating that the blurriness of the certain region is low to the blurred pixel switcher 2270.

Figure 25:
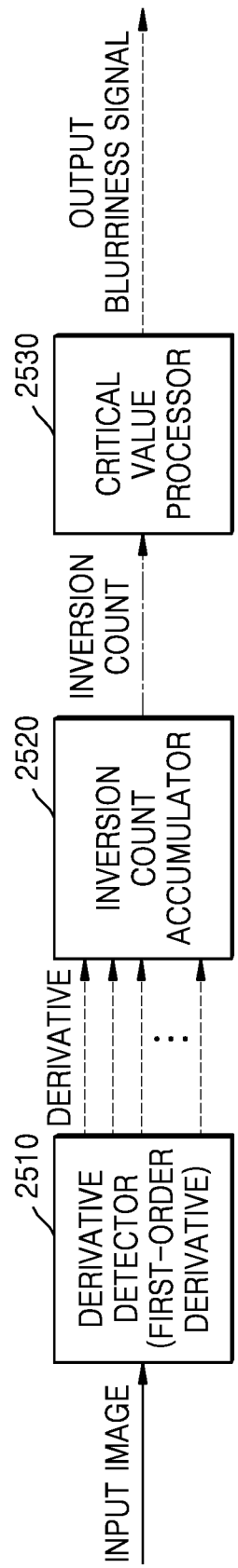
FIG. 25 is a block diagram showing a blurriness detector according to an embodiment.

FIG. 25 is a block diagram showing a blurriness detector according to another embodiment.

Referring to FIG. 25, the blurriness detector may include a derivative detector 2510, an inversion count accumulator 2520, and a critical value processor 2530. Hereinafter, a blurriness detection processing of the blurriness detector shown in FIG. 25 will be described with reference to FIG. 27.

Figure 27:
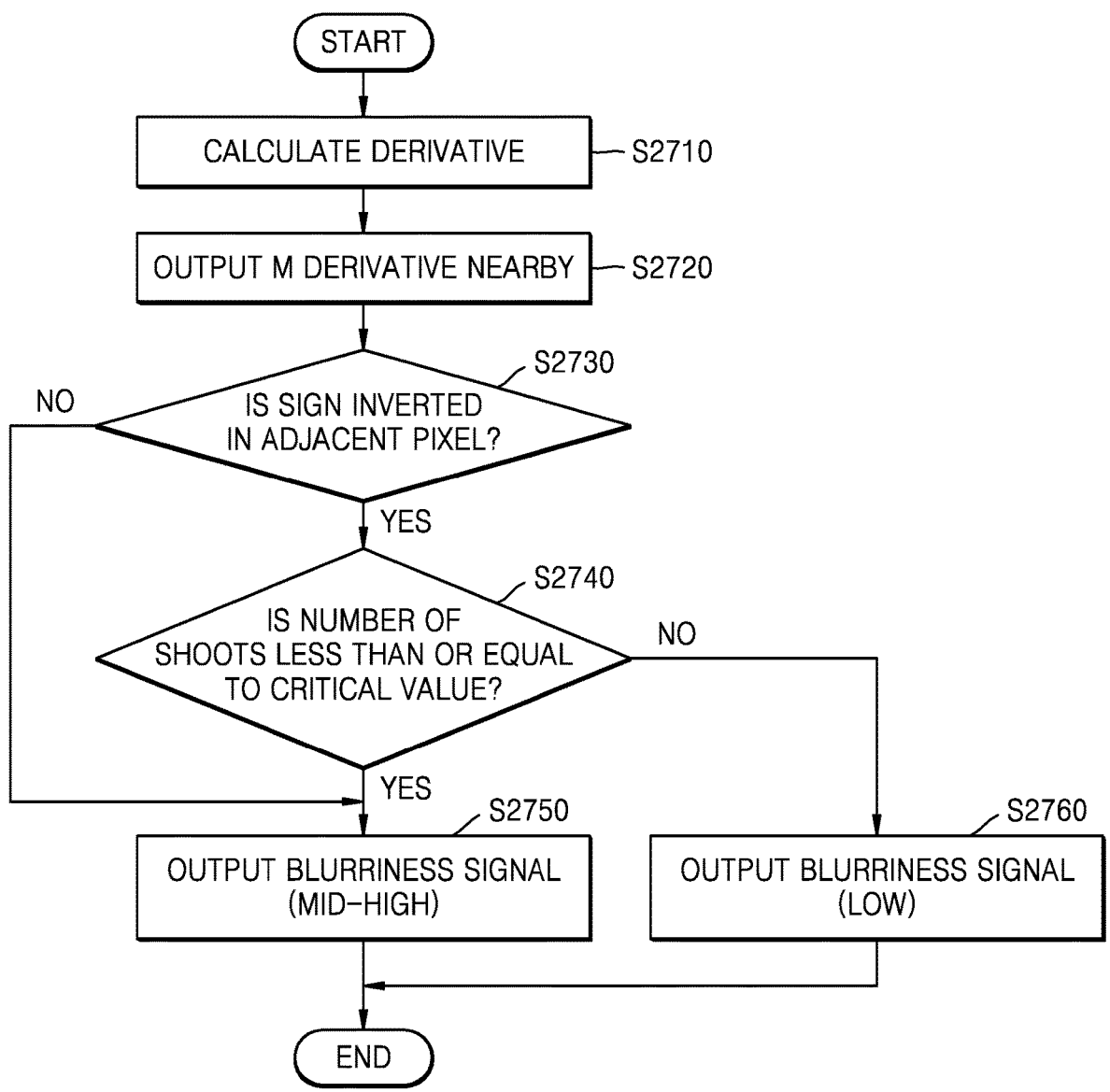
FIG. 27 is a flowchart for describing the operation of the blurriness detector of FIG. 25.

FIG. 27 is a flowchart for describing the operation of the blurriness detector described above with reference to FIG. 25.

In operation S2710, the derivative detector 2310 may calculate derivatives of the pixel values of pixels included in data loaded from a line memory accommodating unit. Here, the derivatives may be calculated by a first-order derivative of the pixel value of each pixel.

In operation S2720, the derivative detector 2510 may collect M pixel derivatives (M is a positive integer) nearby a pixel and output the M pixel derivatives to the inversion count accumulator 2520. In other words, per certain region of an input image, the derivative detector 2510 may output derivatives of pixels included in the certain region to the inversion count accumulator 2520.

In operation S2730, the inversion count accumulator 2520 may compare the derivative signs of adjacent pixels included in the certain region input from the derivative detector 2510 and determine whether the derivative signs of the pixels are inverted. On the other hand, when the derivative signs of the adjacent pixels are not inverted, the inversion count accumulator 2520 may determine that there is no shoot of pixel values in the certain region, and the blurriness detection process may proceed to operation S2750.

In operation S2740, the inversion count accumulator 2520 may determine whether the number of shoots in the adjacent pixels is less than or equal to a critical value. When the derivative signs of the adjacent pixels are inverted, the inversion count accumulator 2520 may determine that there are shoots of pixel values in a certain region and determine whether the number of the shoots is less than or equal to a critical value. In detail, the inversion count accumulator 2520 may accumulate the number of times that the adjacent pixels are inverted and output the accumulated number of times to the critical value processor 2530.

In operation S2750, when the number of the shoots of the pixel values in the certain region is greater than the critical value, the critical value processor 2530 may output a blurriness signal indicating that the blurriness of the certain region is high to the planarized pixel switcher 2270. Alternatively, in operation S2760, when the number of the shoots of the pixel values in the certain region is less than the critical value, the critical value processor 2530 may output a blurriness signal indicating that the blurriness of the certain region is low to the planarized pixel switcher 2270. Here, the critical value used by the critical value processor 2530 will be described with reference to FIG. 30.

Figure 30:
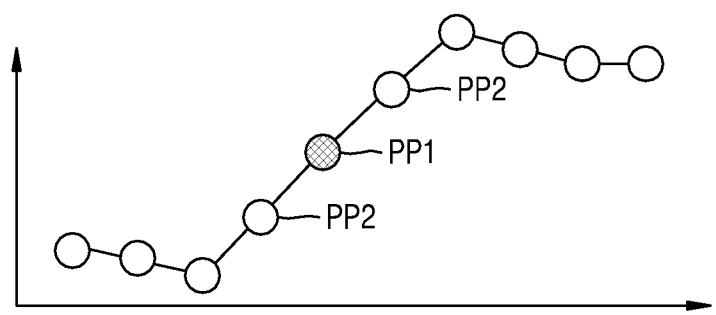
FIG. 30 is a graph showing pixel values of pixels arranged side-by-side along a certain horizontal line of an input image.

FIG. 30 is a graph showing pixel values of pixels arranged side-by-side along a certain horizontal line of an input image. In the graph, the vertical axis represents the pixel values, and the horizontal axis represents the pixel positions. Furthermore, it is assumed in FIG. 30 that the resolution of an input image is 8K, for example.

Referring to FIG. 30, the pixel values of pixels arranged side-by-side along the horizontal line gradually change over plots PP2 of four peripheral pixels around a plot PP1 of a target pixel. In other words, the resolution of change of the pixel value is 2K. However, there is an overshoot on the left side of the plots PP2 of the four peripheral pixels and there is an undershoot on the right side of the plots PP2 of the four peripheral pixels. As such, a change of pixel values with a shoot is not a blurred change. In other words, the blurriness of the region of the pixels arranged side-by-side along the horizontal line is low.

As described with reference to FIG. 30, when there are shoots included in the values of pixels included in a certain region including the plot PP1 of a target pixel and the plots PP2 of peripheral pixels, the critical value used by the critical value processor 2530 shown in FIG. 25 may be determined based on whether the blurriness of the certain region is low.

Referring back to FIG. 22, the blurred pixel switcher 2270 may switch pixel data of a region with a low blurriness, a region with a high blurriness, or a region with a mid-high blurriness to be output to the output pixel switcher 2250 based on a blurriness signal input from the blurriness detector 2260. In detail, the blurred pixel switcher 2270 may perform an image synthesis using blurred image data input from the outline blurrer 2230 for the region with a low blurriness and perform an image synthesis using data read out from a plurality of line memories of the line memory accommodating unit 2210 for the region with a high blurriness or the region with a mid-high blurriness. The blurred pixel switcher 2270 may output synthesized image data to the output pixel switcher 2250 as blurred switch image data.

The output pixel switcher 2250 may switch data regarding pixels output from an outline region and regions other than the outline region including an edge region, a texture region, and a flat region to a display device based on an outline signal input from the outline extractor 2220. In detail, the output pixel switcher 2250 may switch data used for a image synthesis based on the outline level of pixels included in the outline signal input from the outline extractor 2220. In more detail, the output pixel switcher 2250 may perform an image synthesis using a relatively large amount of blurred switch image data input from the blurred pixel switcher 2270 for an outline region with a high outline level and perform an image synthesis by using a relatively large amount of image-enhanced image data input from the image enhancer 2240 for regions other than the outline region. The output pixel switcher 1150 may output synthesized image data to a display device as output image data.

Figure 31:
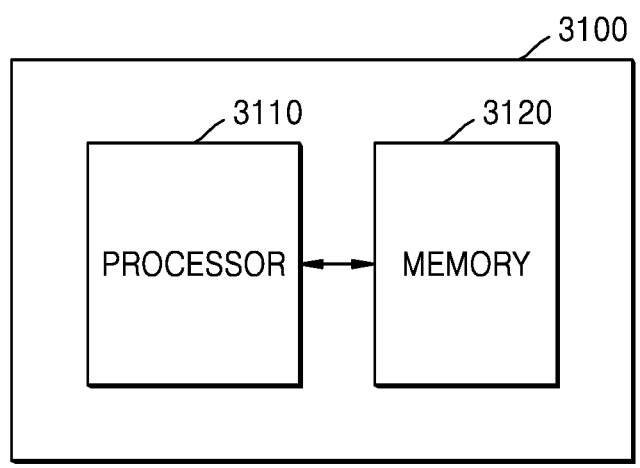
FIG. 31 is a block diagram showing an image processing apparatus according to an embodiment.

FIG. 31 is a block diagram showing an image processing apparatus 3100 according to an embodiment.

Referring to FIG. 31, the image processing apparatus 3100 according to an embodiment may include a processor 3110 and a memory 3120. However, the image processing apparatus 3100 may be configured with fewer components than the above-described components, or other components other than the above-described configurations may be additionally included in the image processing apparatus 3100.

The processor 3110 may perform the operations of the image processing apparatus described above with reference to FIGS. 1 to 30. In detail, the processor 3110 according to an embodiment may determine an edge region whose contrast of the values of pixels included in an image is equal to or greater than a pre-set value. Furthermore, the image processing apparatus 3100 may identify an outline region within the edge region according to the distribution characteristics of the values of the pixels included in the edge region. As the outline region is identified, the image processing apparatus 3100 may perform a blurring processing that reduces the contrast of the values of pixels included in at least a portion of the outline region.

The processor 3110 may identify a region including pixels having edge feature amounts equal to or greater than a critical value in an edge region as an outline region. Furthermore, the processor 3110 may identify a region in which the number of pixels having edge feature amounts equal to or greater than the critical value in the edge region is equal to or greater than a certain value as an outline region.

The processor 3110 according to an embodiment may perform an enhancement processing for increasing the contrast of the values of pixels on at least some of regions other than the outline region. Furthermore, the processor 3110 may perform different enhancement processing on a first region included in the edge region and a second region not included in the edge region, from among regions of the image other than the outline region. According to another example, the processor 3110 may perform an enhancement processing on regions of the image other than the edge region.

Furthermore, the processor 3110 may combine an image subjected to the blurring processing with an image subjected to the enhancement processing.

Meanwhile, as the outline region is identified, the processor 3110 according to another embodiment may perform an enhancement processing for increasing the contrast of the values of pixels on at least some the regions other the outline region, without performing a blurring processing on the outline region.

The embodiments of the disclosure may be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

An apparatus according to an embodiment may include a processor, a memory for storing and executing program data, a permanent storage like a disk drive, a communication port for communicating with an external device, and a user interface like a touch panel, a key, a button, and the like. Methods implemented as software modules or algorithms may be stored on a computer readable recording medium as computer readable codes or program instructions executable on the processor. Here, examples of the computer readable recording medium include a magnetic storage medium (e.g., a read-only memory (ROM), a random-access memory (RAM), a floppy disk, a hard disk, etc.) and an optical reading medium (e.g., a CD-ROM, a digital versatile disc (DVD), etc.). The computer-readable recording medium may be distributed over networked computer systems so that computer readable codes may be stored and executed in a distributed manner. The computer-readable recording medium may be read by a computer, stored in memory, and executed by a processor.

Although specific reference numerals are used in the embodiments shown in the drawings and specific terms are used to describe the embodiments, the disclosure is not limited by specific terminologies. Embodiments may include all components that may be thought by one of ordinary skill in the art.

Some embodiments may be described in terms of functional block components and various processing steps. Such functional blocks may be realized by any number of hardware and/or software components configured to perform the specified functions. For example, embodiments may employ direct circuit components like a memory, a processing, a logic, a look-up table, etc. that may perform various functions under the control of one or more microprocessors or other control devices. Furthermore, embodiments may employ cores of the same type or different types and CPUs of different types. Similar to the components of the disclosure may be implemented with software programming or software components, embodiments may include various algorithms implemented in a combination of data structures, processes, routines, or other programming constructs, such as C, C++, Java (Java), assembler, and the like. Functional blocks may be implemented in algorithms that are executed on one or more processors. Furthermore, the disclosure may employ any number of conventional techniques for electronics configuration, signal processing, and/or data processing. The words "mechanism", "component", "means", and "configuration" are used broadly and are not limited to mechanical or physical embodiment. The term may include the meaning of a series of routines of software in conjunction with a processor or the like.

The specific executions described in the embodiments are, by way of example, not intended to limit the scope of the embodiments in any way. For brevity of description, descriptions of conventional electronic configurations, control systems, software, and other functional aspects of such systems may be omitted. Also, line connections or connection members between the components shown in the drawings are illustrative of functional connections and/or physical or circuit connections, which may be replaced or additionally provided by a variety of functional connections, physical connections, or circuit connections. Also, unless stated otherwise as "essential" or "importantly", it may not be a necessary component for application of the disclosure.

The use of the terms "the" and similar indication words in the description of the embodiments (particularly in the claims) may refer to both singular and plural. Furthermore, in the embodiment, when a range is described, it includes inventions to which the individual values belonging to the above range are applied (if there is no description to the contrary), and is considered that each individual value constituting the above range is described in the detailed description. Finally, operations constituting methods according to embodiments may be performed in an appropriate order, unless there is an explicitly stated order of the operations or any description to the contrary. The embodiments are not necessarily limited to the order the operations are described. The uses of all examples or exemplary terms (e.g., etc.) in the embodiments are for the purpose of describing the embodiments in detail, and the scope of the embodiments is not limited by the examples or exemplary terms, unless being limited by the claims. It will also be appreciated by one of ordinary skill in the art that various modifications, combinations, and alterations may be made depending on design criteria and factors within the scope of the appended claims or equivalents thereof.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image processing method comprising:
    identifying pixels included in an edge region of an object in an image based on differences between contrast of values of pixels included in the image and contrast of values of pixels included in the object;
    identifying pixels included in an outline region in the edge region according to a distribution of characteristics of values of the pixels included in the edge region;
    identifying a blurriness of the outline region based on differential statistics of the values of the pixels included in the image;
    performing blurring processing for reducing contrast of values of pixels included in the outline region in which the blurriness of the outline region is equal to or less than a certain value;
    performing, on at least some regions other than the outline region, enhancement processing for increasing contrast of values of pixels; and
    combining an image subjected to the blurring processing with an image subjected to the enhancement processing.

2. The image processing method of claim 1, wherein the identifying the pixels included in the outline region comprises:
    identifying the pixels included in the edge region having edge feature amounts equal to or greater than a critical value as the pixels included in the outline region.

3. The image processing method of claim 1, wherein the identifying the pixels included in the outline region comprises:
    identifying the pixels included in the edge region having edge feature amounts equal to or greater than a critical value as the pixels included in the outline region.

4. The image processing method of claim 1, wherein the enhancement processing comprises:
    first enhancement processing performed on pixels included in a first region included in the edge region and second enhancement processing performed on pixels included in a second region not included in the edge region from among regions of the image other than the outline region, the first enhancement processing on the first region and the second enhancement processing on the second region being different from each other.

5. The image processing method of claim 1, wherein the enhancement processing comprises:
    enhancement processing on pixels included in regions of the image other than the edge region.

6. The image processing method of claim 1, wherein the identifying the pixels included in the edge region comprises:
    identifying the pixels included in the image having contrast values equal to or greater than a certain value as the pixels included in the edge region.

7. The image processing method of claim 1, wherein the distribution of characteristics of the values of the pixels included in the edge region is determined based on edge feature amounts comprising at least one of a Han-like feature amount, a pixel difference feature amount, a histogram of oriented gradients (HOG) feature amount, an edge orientation histogram (EOH) feature amount, and an Edgelet feature amount.

8. An image processing apparatus comprising:
    a memory configured to store one or more instructions;
    a display; and
    at least one processor configured to execute the one or more instructions stored in the memory, wherein the at least one processor executes the one or more instructions to:
        identify pixels included in an edge region of an object in an image based on differences between contrast of values of pixels included in the image and contrast of values of pixels included in the object,
        identify pixels included in an outline region in the edge region according to a distribution of characteristics of values of the pixels included in the edge region;
        identify a blurriness of the outline region based on differential statistics of the values of the pixels included in the image,
        perform blurring processing for reducing contrast of values of pixels included in the outline region in which the blurriness of the outline region is equal to or less than a certain value,
        perform, on at least some regions other than the outline region, enhancement processing for increasing contrast of values of pixels, and
        combine an image subjected to the blurring processing with an image subjected to the enhancement processing.

9. The image processing apparatus of claim 8, wherein the at least one processor executes the one or more instructions to:
    identify the pixels included in the edge region having edge feature amounts equal to or greater than a critical value as the pixels included in the outline region.

10. The image processing apparatus of claim 8, wherein the at least one processor executes the one or more instructions to:

identify the pixels included in the edge region having edge feature amounts equal to or greater than a critical value as the pixels included in the outline region.

11. The image processing apparatus of claim 8, wherein the at least one processor executes the one or more instructions to:

perform first enhancement processing on pixels included in a first region included in the edge region and second enhancement processing on pixels included in a second region not included in the edge region from among regions of the image other than the outline region, the first enhancement processing on the first region and the second enhancement processing on the second region being different from each other.

12. The image processing apparatus of claim 8, wherein the at least one processor executes the one or more instructions to:

perform the enhancement processing on pixels included in regions of the image other than the edge region.

13. The image processing apparatus of claim 8, wherein the at least one processor executes the one or more instructions to:

identify, as the pixels included in the edge region, pixels included in the image having contrast values equal to or greater than a certain value.

14. The image processing apparatus of claim 8, wherein the distribution of characteristics of the values of the pixels included in the edge region is determined based on edge feature amounts comprising at least one of a Han-like feature amount, a pixel difference feature amount, a histogram of oriented gradients (HOG) feature amount, an edge orientation histogram (EOH) feature amount, and an Edgelet feature amount.

15. A non-transitory computer program product comprising a computer-readable recording medium having recorded thereon a computer program configured to perform an image processing method comprising:

identifying pixels included in an edge region of an object in an image based on differences between contrast of values of pixels included in the image and contrast of values of pixels included in the object;

identifying pixels included in an outline region in the edge region according to a distribution of characteristics of values of pixels included in the edge region;

identifying a blurriness of the outline region based on differential statistics of the values of the pixels included in the image, performing blurring processing for reducing contrast of values of pixels included in the outline region in which the blurriness of the outline region is equal to or less than a certain value;

performing, on at least some regions other than the outline region, enhancement processing for increasing contrast of values of pixels; and combining an image subjected to the blurring processing with an image subjected to the enhancement processing.

16. The non-transitory computer program product of claim 15, wherein the identifying the pixels included in the outline region comprises:

identifying the pixels included in the edge region having edge feature amounts equal to or greater than a critical value as the pixels included in the outline region.

\* \* \* \* \*